United States Patent
Lelescu et al.

(10) Patent No.: US 8,587,703 B2
(45) Date of Patent: Nov. 19, 2013

(54) SYSTEMS AND METHODS FOR IMAGE RESTORATION

(75) Inventors: Dan Lelescu, Morgan Hill, CA (US); Chihsin Wu, San Jose, CA (US); David R. Pope, Fremont, CA (US); Cheng Lu, Santa Clara, CA (US)

(73) Assignee: Aptina Imaging Corporation, Georgetown, Grand Cayman ( * ) Notice: Subject to any disclaimer, the term of this patent is extended or adjusted under 35 U.S.C. 154(b) by 864 days.

(21) Appl. No.: 12/628,604

(22) Filed: Dec. 1, 2009

(65) Prior Publication Data

US 2011/0128407 A1    Jun. 2, 2011

(51) Int. Cl.
*H04N 9/64* (2006.01)
*G06K 9/40* (2006.01)
*H04N 3/14* (2006.01)

(52) U.S. Cl.
USPC .......................... 348/251; 382/254; 348/272

(58) Field of Classification Search
USPC ............ 348/208.99, 241, 248, 251, 255, 259, 348/250, 224.1, 345, 340, 335, 246, 252, 348/222.1, 272, 223.1; 382/254–255, 167
See application file for complete search history.

(56) References Cited

U.S. PATENT DOCUMENTS

| | | | | |
|---|---|---|---|---|
| 7,728,844 | B2 * | 6/2010 | Trimeche et al. | 345/589 |
| 8,054,350 | B2 * | 11/2011 | Kyung | 348/251 |
| 2006/0013479 | A1 * | 1/2006 | Trimeche et al. | 382/167 |

OTHER PUBLICATIONS

Biemond, et al., "Iterative Methods for Image Deblurring" Proceedings of the IEEE, vol. 78, No. 5, May 1990, pp. 856-883.
William H. Richardson, "Bayesian-Based Iterative Method of Image Restoration" Journal of the Optical Society of America, vol. 62, No. 1, Jan. 1972, pp. 55-59.

* cited by examiner

*Primary Examiner* — James Hannett
*Assistant Examiner* — Ahmed A Berhan
(74) *Attorney, Agent, or Firm* — Kramer Levin Naftalis & Frankel LLP

(57) ABSTRACT

Systems and methods are provided for focus recovery of multi-channel images. Control circuitry of an imaging system can restore an image by removing image blurring introduced by the lens, sensor noise introduced by the sensor, and a signal offset between multiple channels of the image. In some embodiments, the control circuitry can calculate one or more estimates of a signal offset of multiple observed signals. Using statistics generated from offset-removed signals, the control circuitry can generate one or more recovery kernels which can be applied to offset-removed signals to generate recovered signals. In other embodiments, instead of explicitly removing a signal offset from each observed signal, the control circuitry can implicitly remove the signal offset when calculating the first and second order statistics of one or more observed signals.

31 Claims, 11 Drawing Sheets

SYSTEMS AND METHODS FOR IMAGE RESTORATION

FIELD OF THE INVENTION

This is directed to systems and methods for focus recovery of multi-channel images.

BACKGROUND OF THE INVENTION

Modern mobile imaging systems, such as still cameras and video cameras, are capable of capturing images. A camera can capture an image by first passing the image through a lens. A sensor on the camera can then sample the captured image.

Unfortunately, these processing steps can often introduce undesirable degradations to the original image. For example, blurring and noise can be introduced to the original image by the lens and sensor. Furthermore, efforts at restoring the degraded image using complex image processing techniques are not feasible in the context of mobile imaging systems as these techniques have intensive computational demands.

DETAILED DESCRIPTION OF THE INVENTION

Discussed herein are systems and methods for focus recovery of multi-channel images.

Figure 1:
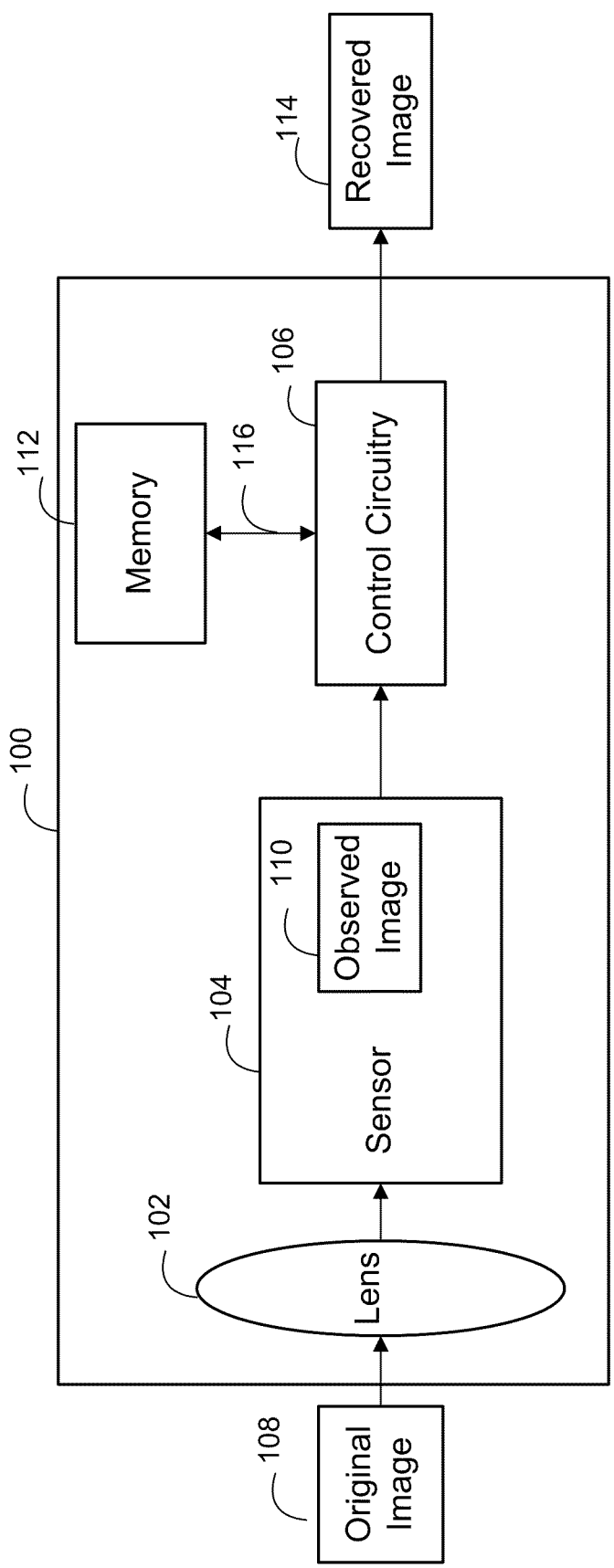
FIG. 1 is a schematic view of an illustrative imaging system in accordance with embodiments of the invention.

FIG. 1 is a schematic view of an illustrative imaging system in accordance with embodiments of the invention. Imaging system 100 can be any type of imaging system that utilizes a lens (embodied here as lens 102) and a sensor (embodied here as sensor 104) and is controlled generally by control circuitry 106. Imaging system 100 can be a non-mobile imaging system or device, such as, for example, a desktop computer camera or medical imaging equipment. Alternatively, imaging system 100 can a mobile imaging system or device such as, for example, a portable still camera, a portable video camera, or a camera phone. Persons skilled in the art will appreciate that imaging system 100 can include any other components in a typical camera (or otherwise) not shown in FIG. 1.

Imaging system 100 can capture original image 108 by passing the image through lens 102. Lens 102 can include any suitable type of lens for focusing an image such as, for example, an extended depth of field (EDOF) lens or a fisheye lens. In some embodiments, lens 102 can introduce blurring to original image 108, which can cause a scrambling of the signals in original image 108. The blurring may vary across the image plane of original image 108 (e.g., less blurring can be found in the center of the image plane as compared to the edge of the image plane) and across different channels (e.g., color channels) of original image 108. A point spread function (PSF), which can be a function of both field height and color channel, can be used to characterize the blurring in a region of original image 108.

Imaging system 100 can include sensor 104 which can be any suitable image capturing technology such as, for example, a CMOS imager or a charge-coupled device (CCD) imager. Sensor 104 can be implemented using any suitable combination of hardware and software. For example, sensor 104 can be implemented substantially all in hardware as a system-on-a-chip (SoC). This way, sensor 104 can have a small design with minimized area and circuit components designed to maximize the speed of operation.

Figure 2:
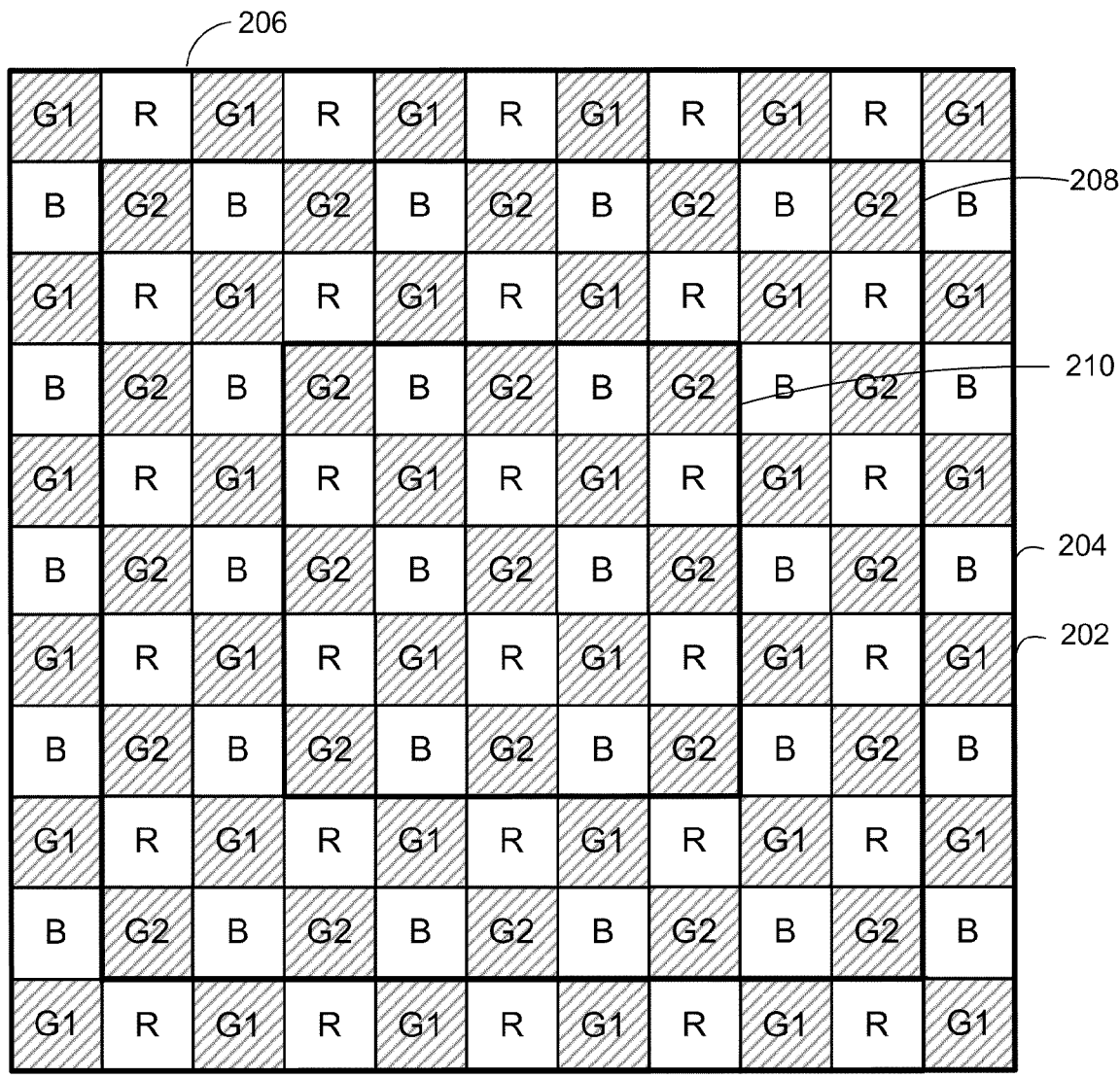
FIG. 2 is a representation of an illustrative fragment of an image with a Bayer pattern in accordance with embodiments of the invention.

After original image 108 passes through lens 102, sensor 104 can sample the blurred image and produce an electric charge at each pixel in the image. Sensor 104 can then quantize the electric charge at each pixel to produce observed image 110. As used herein, a "pixel" may refer to a photo-element unit cell which includes a photosensor and associated structure for converting photons to an electrical signal. In some embodiments, observed image 110 may be an image with a raw Bayer pattern. As a result, observed image 110 may have multiple down-sampled color channels (e.g., red, blue, green1 and green2 color channels). FIG. 2 shows an example fragment of an image with a Bayer pattern. As shown in image fragment 200, "R", "B", "G1", and "G2" represent pixels in the red, blue, green1, and green2 color channels, respectively.

Referring back to FIG. 1, in some embodiments, in the process of sampling the blurred image, sensor 104 can further degrade the blurred image by introducing additional noise sources such as sensor noise and signal offset. Sensor noise may be dependent on imaging conditions (e.g., sensor state signals conditions such as analog gain for a particular channel) and may vary across the signals in the blurred image. As used herein, a "signal" may refer to all of the pixels in an image for a given color channel.

Signal offset can be an imbalance that occurs between two color channels of an image despite nearly-identical spectral response of the two color channels (e.g., channel imbalance between the green1 and green2 color channels). Signal offset can be caused by one or more factors. For example, electronics in imaging system 100 can block light from reaching certain parts of an image (e.g., the green2 color channel may receive more light than the green1 color channel in the upper left corner of an image, and, as a result, an offset may be introduced between the two channels). As another example, different analog amplifiers in sensor 104 can introduce an offset by generating different gains between two different color channels. As yet another example, crosstalk can introduce an offset by causing the responses of signals in two spectrally similar color channels (e.g., green1 and green2 color channels) to differ. Thus, signals from one color channel may be influenced by neighboring signals from a different color channel. For instance, as shown in image fragment 200 of FIG. 2, signals from the green2 color channel can have higher values than signals from the green1 color channel in a blue part of image fragment 200 (e.g., in row 202). In contrast, signals from the green1 color channel can have higher values than signals from the green2 color channel in a red part of image fragment 200 (e.g., in row 204). As a result of these factors, signal offset in an image may not be constant and may be a function of the field height, the imaging condition, the imaging content, and/or any combination thereof.

Referring back to FIG. 1, imaging system 100 can include control circuitry 106, which may be capable of controlling camera operations and image focus. Control circuitry 106 may also be capable of performing any suitable operation on observed image 110, such as, for example, automatic exposure, color balancing, and focus recovery in order to produce recovered image 114. In addition, control circuitry 106 may be capable of communicating with memory 112 over a bus 116. Control circuitry 106 may include, for example, one or more processors, digital signal processors, microprocessors, ASICS, FPGAs, or any suitable combination of hardware and software.

Memory 112 can include any suitable combination of non-volatile and volatile memories, such as cache memory, Flash memory, random access memory (RAM) (e.g., DDR RAM and/or SRAM), read only memory (ROM), removable memory, or any combination thereof. Memory 112 may be on a different chip than control circuitry 106 or may be combined with control circuitry 106 on a single integrated circuit.

Memory 112 can include memory modules operative to provide mass storage for control circuitry 106. For example, memory 112 can be used by control circuitry 106 to store images captured by imaging system 100 and any other information related to the captured images. The information can include any suitable information such as, for example, blurring information associated with observed image 110, information associated one or more weights, a parameterization of a sensor noise model, and/or parameterizations of any suitable type of processing of observed image 110 (e.g., lens shading correction).

Control circuitry 106 may use multiple imaging processing techniques to estimate the degradations introduced by lens 102 and sensor 104. However, for a mobile imaging system, computational constraints may limit the types of image processing that may be available. For example, an iterative solution (e.g., a Richardson-Lucy solution) or a solution that employs the application of frames and frame-level buffers may not be feasible for a mobile imaging system. As a result, control circuitry 106 may instead perform focus recovery on observed image 110. For example, the control circuitry can generate one or more recovery kernels. For instance, the one or more recovery kernels can define a spatial filter that may be used to reconstruct original image 108 from observed image 110. Since this approach is not an iterative solution, the control circuitry can perform focus recovery more efficiently. In addition, in contrast to an iterative solution, the imaging system does not have to determine when to terminate the iteration.

The one or more recovery kernels can adapt to one or more localized signals of observed image 110 (e.g., signals can be localized in multiple regions and/or pixels of observed image 110). The one or more localized signals can be estimated from information and statistics obtained from observed image 110, the sensor, and/or the lens. The localized signals can include, for example, lens blurring information, signal and signal-dependent noise statistics (e.g., sensor noise), color channel information, and sensor state information. By being non-iterative, the resulting focus recovery solution has lower computational costs and thus can be implemented on a mobile imaging system. In addition, by being locally adaptive, the resulting focus recovery solution can handle the complexities of image degradation.

Focus recovery can include operations for reducing both the blurring introduced by a lens (e.g., lens 102 of FIG. 1) and the sensor noise introduced by a sensor (e.g., sensor 104 of FIG. 1) of the imaging system. In some embodiments, in order to balance the advantages of performing high quality image recovery techniques with the computational demands of a mobile imaging system, the control circuitry can perform per-channel focus recovery for a per-channel subset of an observed image (e.g., per-channels such as red and blue color channels of observed image 110 of FIG. 1) and cross-channel focus recovery for a cross-channel subset of the observed image (e.g., cross-channels such as green1 and green2 color channels of observed image 110 of FIG. 1). Per-channel focus recovery may be chosen for the red and blue color channels because the human eye is less sensitive to degradations in the observed image for these channels as compared to the green color channels. A more detailed description of per-channel focus recovery can be found in commonly assigned U.S. patent application Ser. No. 12/128,234, entitled "Method and Apparatus for Extended Depth-of-Field Image Restoration" and filed on May 28, 2008, which is incorporated by reference herein in its entirety.

Moreover, prior to performing cross-channel focus recovery for the cross-channel subset, the control circuitry can remove one or more signal offsets introduced by the sensor. Persons skilled in the art will appreciate that although the following description describes performing cross-channel focus recovery for only a subset of the color channels, cross-channel focus recovery may also be extended to include all color channels of an observed image.

For cross-channel focus recovery, a model which can describe the signal offset introduced by the sensor can be given by:

$$g_1' = g_1 + r \quad (1)$$

$$g_2' = g_2 - r \quad (2)$$

where $g_1$ and $g_2$ are offset-removed signals from the green1 and green2 color channels, respectively, $g_1'$ and $g_2'$ are observed signals from the green1 and green2 color channels, respectively, and r is the signal offset introduced by the sensor. As used herein, an observed signal may include all of the pixels of an observed image for a given color channel.

Furthermore, for cross-channel focus recovery, a model which can describe both the blurring from the lens and the sensor noise from the sensor can be given by:

$$g = Hx + w \quad (3)$$

where $$g = \{g_1, g_2\} \quad (4)$$

and x is a vector representing signals of an original image (e.g., original image 108 of FIG. 1), H is a matrix representing the cross-channel PSF which characterizes the blurring in a region of the original image, and w is the cross-channel noise.

Moreover, for per-channel focus recovery, a model which can describe both the blurring from the lens and the sensor noise from the sensor can be given by:

$$y = H^{sc} x + w^{sc} \quad (5)$$

where y is an observed signal from either the red or blue color channel, x is a signal from either the red or blue color channel of the original image, $H^{sc}$ is a matrix representing the per-channel PSF which characterizes the blurring in a region of the original image, and $w^{sc}$ is the per-channel noise.

Finally, for both per-channel and cross-channel focus recovery, a recovery kernel function k can be generated to recover the original signals. The recovery kernel function k can be described by:

$$k=k(\text{PSF},\text{SNR},\text{sensor state}) \quad (6)$$

where PSF can be either the cross-channel PSF or the per-channel PSF depending on the type of focus recovery being performed, SNR is the signal to noise ratio, and sensor state is a state signal received from the sensor. The implementation of recovery kernels will be described in greater details below.

Figure 3:
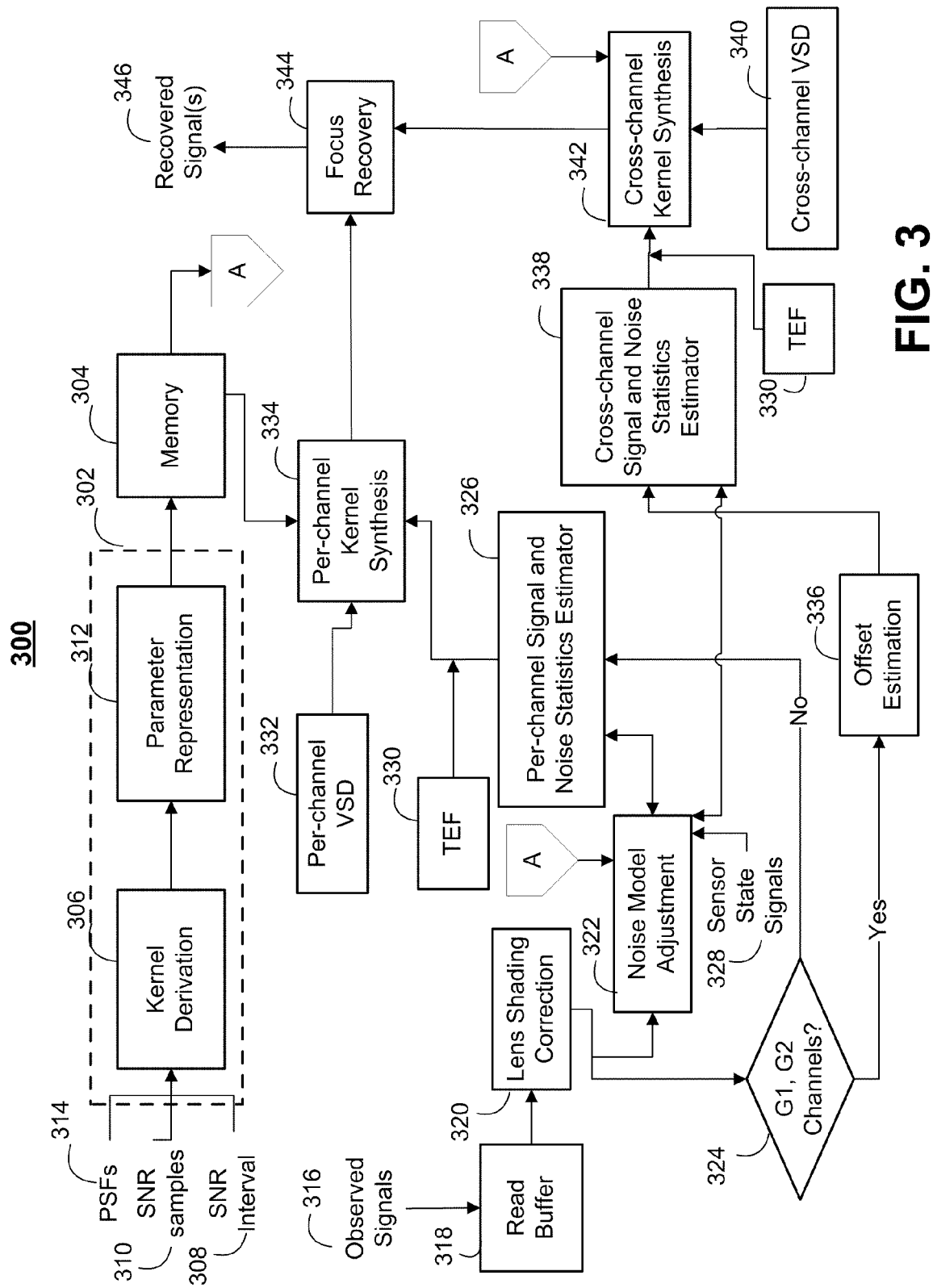
FIG. 3 is a block diagram showing an illustrative data flow of an imaging system in accordance with embodiments of the invention.

First, FIG. 3 will be described with continued reference to image fragment 200 of FIG. 2. FIG. 3 shows a block diagram of the data flow of an imaging system, which may be configured in accordance with embodiments of the invention. Data flow 300 may be executed on any suitable imaging system, such as, for example, imaging system 100 of FIG. 1.

Data flow 300 may include an offline process 302 (indicated by the dashed line in FIG. 3) in which control circuitry (e.g., control circuitry 106 of FIG. 1) can determine one or more parameters for image recovery and can store the one or more parameters in memory 304. In some embodiments, the control circuitry can perform the one or more operations in offline process 302 at one time prior to performing online processing. Memory 304 can include any of the features or functionalities of memory 112 of FIG. 1 (and vice versa). Because process 302 is performed offline, the control circuitry can perform complex computations (e.g., transforms) on the imaging system with less computational constraints.

For offline process 302, data flow 300 can begin at kernel derivation module 306 where the control circuitry can receive SNR interval 308. SNR interval 308 can be based on an expected range. In some embodiments, the expected range can be defined by a lower bound $s_0$ and an upper bound $S_1$.

The control circuitry can also receive SNR samples 310, which can be a sampling of SNR interval 308. For example, SNR samples 310 can be obtained by sampling SNR interval 308 at a pre-defined granularity (e.g., in the linear or logarithmic domain). Thus, SNR samples 310 can be a set of SNR values in SNR interval 308.

In some embodiments, the control circuitry can receive one or more PSFs 314, which can provide blurring information from a lens (e.g., lens 102 of FIG. 1) for both a per-channel subset and a cross-channel subset. PSFs 314 can be calculated in any suitable manner such as, for example, by modeling using the lens specifications, by measuring, by inference, and/or any combination thereof.

At kernel derivation module 306, for each pre-determined region of the observed image, the control circuitry can determine one or more restoration kernels for both a per-channel subset and a cross-channel subset. The control circuitry can obtain the pre-determined regions by, for example, dividing the observed image at a particular granularity. For instance, as shown in FIG. 2, region 206 may represent an example of a pre-determined region of image fragment 200.

Returning again to FIG. 3, at parameter representation module 312, the control circuitry can determine information associated with the PSF for each pre-determined region of the observed image. By determining the information associated with the PSF for each pre-determined regions in the observed image, the control circuitry can better adapt to the spatial variability of lens blurring. In general, finer granularities can capture more blurring variations, which can allow the control circuitry to better adapt to signal, noise, and channel characteristics. As a result, degradations introduced by the lens can be more easily inverted in the online focus recovery process.

In some embodiments, for per-channel focus recovery, the control circuitry can determine the information associated with the PSF by sampling PSFs 314 in a rectangular configuration within a pre-determined region. For example, referring to FIG. 2, the control circuitry can sample PSFs 314 by separately sampling each color channel (e.g., red or blue color channel) within region 206 in a rectangular configuration. For cross-channel focus recovery, on the other hand, the control circuitry can determine the information associated with the PSF by sampling PSFs 314 in a quincunx configuration (e.g., diamond configuration) within a pre-determined region. Moreover, because the green1 and green2 color channels are spectrally similar, the same information associated with the PSF can be generated for both the green1 and the green2 color channels. Referring again to FIG. 2, the control circuitry can sample the PSFs by sampling the pixels for both the green1 and green2 color channels within region 206 (e.g., the shaded pixels within region 206).

After determining the information associated with the PSF for both per-channel focus recovery and cross-channel focus recovery, the control circuitry can store the information associated with the PSF stored in memory 304. For example, the control circuitry can store SNR interval 308 (e.g., lower bound $s_0$ and an upper bound $s_1$) in memory 304. As another example, for per-channel focus recovery, the control circuitry can store the regularized inverse $h^-$ of the per-channel PSF h and an additional per-channel blurring constant $\gamma_h^{sc}=\text{Tr}\{H^{sc}H^{sc^T}\}$ in memory 304. In addition, for cross-channel focus recovery, the control circuitry can store the regularized inverse $h_{XFR}^-$ of the cross-channel PSF $h_{XFR}$ and an additional cross-channel blurring constant $\gamma_h=\text{Tr}\{HH^T\}$ in memory 304. As used herein, the notations h and $h_{XFR}$ refer to the per-channel PSF and the cross-channel PSF, respectively. Moreover, the notations $h^-$ and $h_{XFR}^-$ refer to the regularized inverse kernels of the per-channel PSF h and the cross-channel PSF $h_{XFR}$, respectively. The stored information can later be used during the online process to remove blurring from observed signals 316 (e.g., the information associated with the PSF can be applied to the observed signals 316 as a strong sharpening edge filter).

In addition, for both the per-channel subset and the cross-channel subset, the control circuitry can determine a best fit of a parameterization of the restoration kernels generated in kernel derivation module 306. For example, the control circuitry can determine a best fit based on a regularized inverse of the PSF (e.g., $h^-$ or $h_{XFR}^-$), a box filter, and SNR samples 310. For instance, at each SNR sample 310, the control circuitry can determine one or more weights for matching the combination of regularized inverse of the PSF and the box filter to the restoration kernels. After determining the one or more weights, the control circuitry can generate information associated with the one or more weights (e.g., coefficients) that can represent the variation of the one or more weights as a function of the SNR (e.g., a polynomial generated using a linear, minimum mean square error fit). For example, for per-channel focus recovery, the information associated with the one or more weights can be represented by $v=v(\text{SNR})$. As another example, for cross-channel focus recovery, the information associated with the one or more weights can be represented by $v_{XFR}=v_{XFR}(\text{SNR})$. The control circuitry can then store the information associated with the one or more weights in memory 304.

In some embodiments, the control circuitry can generate a sensor noise model in offline process 302, which can model the noise characteristics of a sensor (e.g., sensor 104 of FIG.

1) of a system (e.g., imaging system 100 of FIG. 1). The control circuitry can generate the sensor noise model using any suitable approach, such as, for example, by generating a non-linear function modeled based on the sensor's behavior (e.g., using an empirical method for parameterization). The control circuitry can then store a parameterization of the sensor noise model in memory 304. In some embodiments, the control circuitry can store a parameterization for lens shading correction. Lens shading correction will be further described in connection with lens shading correction module 320.

After storing the information associated with the one or more weights, the information associated with the PSF, the parameterization of the sensor noise model, and the parameterization for lens shading correction in memory 304, offline process 302 may end. The control circuitry can then begin to perform online processing of observed signals 316. It will be understood that offline process 302 and the online process can be performed on different hardware platforms. For example, offline process 302 can be performed on a non-mobile imaging system or device (e.g., a personal computer). In contrast, the online process can be performed on a mobile imaging system or device.

In some embodiments, online processing may include computations that require less computational power as compared to offline processing. For example, the control circuitry may obtain information associated with one or more weights calculated offline and use the information to synthesize recovery kernels for focus recovery. By separating data flow 300 into offline and online processes, the imaging system can provide a compromise between operating under tight computational constraints and providing advanced processing features for image recovery.

For online processing, data flow 300 can start by receiving observed signals 316 at read buffer 318. Observed signals 316 may be obtained from an observed image (e.g., observed image 110 of FIG. 1) generated by a sensor (e.g., sensor 104 of FIG. 1) of the imaging system. In some embodiments, observed signals 316 may include multiple subsets of signals. For example, a per-channel subset of observed signals 316 may include signals associated with the color channels used for per-channel focus recovery (e.g., red and blue color channels). In addition, a cross-channel subset of observed signals 316 may include signals associated with the color channels used for cross-channel focus recovery (e.g., green1 and green2 color channels).

Then, at lens shading correction module 320, the control circuitry can use lens shading correction to reduce the effects of the signal offset for all color channels. In some embodiments, the control circuitry can transmit the scaling information from lens shading correction module 320 to noise model adjustment module 322.

At noise model adjustment module 322, the control circuitry can obtain a parameterization of a sensor noise model, which may be pre-computed and stored in memory (e.g., memory 304). For example, the parameterization of the sensor noise model may have been previously generated in offline process 302. After obtaining the parameterization of the sensor noise model, the control circuitry can adjust the parameterization of the sensor noise model based on the scaling information obtained from lens shading correction module 320. Persons skilled in the art will appreciate that in addition to adjusting for lens shading correction, the control circuitry can adjust the sensor noise model based on any other processing that may have changed pixel values.

After processing the color channels at lens shading correction module 320, data flow 300 may move to decision module 324. At decision module 324, the control circuitry can determine whether a subset of observed signals 316 have color channels corresponding to the selection of processing for the cross-channels. If, at decision module 324, the control circuitry determines that a subset of observed signals 316 does not have color channels corresponding to the cross-channels selection, the control circuitry can pass the subset of observed signals 316 to per-channel signal and noise statistics estimator 326.

At per-channel signal and noise statistics estimator 326, the control circuitry can determine signal statistics of the per-channel subset. Thus, for each color channel of the per-channel subset and for each pixel (i,j) in a pre-determined region (e.g., a pre-determined region used to calculate information associated with the PSF), the control circuitry can use an M×M window S (e.g., M=5) centered at the pixel to perform an estimation of the signal statistics in window S. For example, in order to obtain the signal statistics, the control circuitry can read the observed signals in window S. Based on the observed signals, the control circuitry can compute the first order statistic (e.g., the local sample mean $\mu_y$) and the second order statistic $\sigma_y^2$ of each color channel of the per-channel subset.

After generating the statistics of each color channel of the per-channel subset, the control circuitry can obtain an estimate of the second order statistic of the per-channel sensor noise $\hat{\sigma}_{w_l^{sc}}^2$ from noise model adjustment module 322. For example, the control circuitry can transmit the first order statistic of each color channel of the per-channel subset to noise model adjustment module 322.

Then, at noise model adjustment module 322, the control circuitry can obtain sensor state signals 328 (e.g., channel-dependent analog gain) from the sensor and first order statistic of observed signals $\mu_y$ from per-channel signal and noise statistics estimator 326. After obtaining sensor state signals 328 and the first order statistic of the observed signals, the control circuitry can provide second order statistic of the per-channel sensor noise (e.g., variance of the sensor noise of each color channel $\hat{\sigma}_{w_l^{sc}}^2$) at each pixel (i,j) in the observed image.

For example, at a pixel (i,j) where window S is centered, an estimate of the variance of the per-channel sensor noise $\hat{\sigma}_{w_l^{sc}}^2$ of each color channel of the per-channel subset can be described by:

$$\hat{\sigma}_{w_l^{sc}}^2 f(\mu_y, \text{analogue\_gain}_l) \quad (7)$$

where l indexes the color channel (e.g., red or blue color channel), analogue_gain$_l$ is the analog gain of color channel l, $\mu_y$ is the first order statistic (e.g., local sample mean) of color channel l, and f is the parameterization of the sensor noise model. As discussed previously, noise model adjustment module 322 may adjust the parameterization of the sensor noise model stored in memory based on scaling information obtained from lens shading correction module 320.

Returning back to per-channel signal and noise statistics estimator 326, based on the estimate of the variance of the per-channel sensor noise $\hat{\sigma}_{w_l^{sc}}^2$, the control circuitry can calculate a per-channel SNR estimate at each pixel (i,j) of the per-channel subset. For example, the control circuitry can first determine an estimate of the variance $\hat{\sigma}_x^2$ of the original signal at each pixel (i,j). The original signal can be, for instance, a signal that has not been degraded by the lens and the sensor (e.g., signals from original image 108 of FIG. 1). In some embodiments, the control circuitry can assume that the original signal is locally-stationary and white (e.g., the original signal can have a diagonal correlation matrix). Under such an assumption, the estimated variance of the original signal $\hat{\sigma}_x^2$ at each pixel (i,j) where window S is centered can be represented by:

$$\hat{\sigma}_x^2 = \frac{\sigma_y^2 - \hat{\sigma}_{w_l^{sc}}^2}{\gamma_h^{sc}} \quad (8)$$

where $\gamma_h^{sc}$ is the additional per-channel blurring constant calculated for a pre-determined region where pixel (i,j) is located, and $\sigma_y^2$ is the variance of each color channel in window S. As described in offline process 302, $\gamma_h^{sc}$ may be pre-computed and stored in memory 304. In some embodiments, given the estimated variance of the original signal $\hat{\sigma}_x^2$ and the estimated variance of the per-channel sensor noise $\hat{\sigma}_{w_j^{sc}}^2$, the per-channel SNR estimate $S\hat{N}R$ (i,j) at pixel (i,j) in an M×M window S (e.g., M=5) can be represented by:

$$S\hat{N}R(i, j) = \frac{\hat{\sigma}_x^2}{\hat{\sigma}_{w_l^{sc}}^2} \quad (9)$$

In some embodiments, after obtaining the per-channel SNR estimate $S\hat{N}R$ (i,j), the control circuitry can apply a targeted edge filter (TEF) 330 to pre-process the signals prior to applying a per-channel recovery kernel. The application of TEF 330 may depend on a TEF system setting. For example, TEF 330 may be applied if TEF system setting is set to "ON".

TEF 330 can include any suitable filter for enhancing edges in an image, such as, for example, a nonlinear anisotropic bilateral filter. In some embodiments, TEF 330 may enhance edges by classifying pixels based on various features in an image.

For any particular color channel, TEF 330 can be applied for a single channel or across multiple channels. For example, for the per-channel subset, the control circuitry can first determine the color channel of current pixel (i,j). Then, the control circuitry can use only samples of the same color channel as input to TEF 330. As another example, for the cross-channel subset, the control circuitry can use samples from the color channels of the cross-channel subset (e.g., green1 and green2 color channels) as input to TEF 330.

In some embodiments, the control circuitry can apply TEF 330 only when $S\hat{N}R$ (i,j) exceeds a pre-determined threshold. By applying TEF 330 only when the SNR estimate exceeds the pre-determined threshold, TEF 330 can operate on clearly defined features in the image where the application of TEF 330 is more likely to be successful.

In some embodiments, the application of TEF 330 may change the estimated statistics of the observed signals, and may correspondingly change the SNR estimate (e.g., $S\hat{N}R$ (i,j)). In such a case, the control circuitry can perform one or more actions to mitigate the change in the estimated statistics. For example, the control circuitry can update $S\hat{N}R$ (i,j) prior to applying a recovery kernel (at a focus recovery module such as focus recovery module 344). As another example, the control circuitry can set the pre-determined threshold such that TEF 330 may apply only in particular instances.

Referring back to per-channel signal and noise statistics estimator 326, if the TEF system setting is instead set to "OFF", the control circuitry can bypass TEF 330 and can move either to per-channel Variable Statistics Decision (VSD) module 332 or per-channel kernel synthesis module 334 depending on a VSD system setting of the imaging system. Persons skilled in the art will appreciate that per-channel VSD module 332 can optionally be applied before TEF 330.

In some embodiments, if the VSD system setting is set to "ON", at per-channel VSD module 332, the control circuitry can compute an additional per-channel SNR estimate at pixel (i,j). For example, at per-channel signal and noise statistics estimator 326, the control circuitry may have used a window of size M=5 to compute a first per-channel SNR estimate $S\hat{N}R_{5\times5}$(i,j) at pixel (i,j). Therefore, at per-channel VSD module 332, the control circuitry may also use a smaller window (e.g., a window of size M=3) to compute a second per-channel SNR estimate $S\hat{N}R_{3\times3}$(i,j) at pixel (i,j). The smaller window can be centered at the same pixel as the larger window. In some embodiments, the control circuitry can calculate the second per-channel SNR estimate in per-channel signal and noise statistics estimator 326.

Furthermore, the control circuitry can also use a decision process to select which per-channel SNR estimate to use for calculating the per-channel recovery kernel at pixel (i,j). The decision process can be defined as follows:

$$\text{If } S\hat{N}R_{5\times5}(i, j) < s_0 \wedge S\hat{N}R_{5\times5}(i, j) < S\hat{N}R_{3\times3}(i, j) \quad (10)$$
$$S\hat{N}R(i, j) = S\hat{N}R_{5\times5}(i, j)$$
$$\text{else}$$
$$S\hat{N}R(i, j) = S\hat{N}R_{3\times3}(i, j)$$
$$\text{end}$$

The per-channel SNR estimate resulting from this decision process can be used to calculate the per-channel recovery kernel.

After determining which per-channel SNR estimate to use at per-channel VSD module 332, data flow 300 may move to per-channel kernel synthesis module 334. Alternatively, if the VSD system setting is instead set to "OFF", the control circuitry can bypass per-channel VSD module 332 and move to per-channel kernel synthesis module 334.

At per-channel kernel synthesis module 334, the control circuitry can calculate a per-channel recovery kernel. For example, the control circuitry can receive information associated with one or more weights from memory 304 (e.g., the information associated with one or more weights can be represented by v=v(SNR)). Based on the information associated with the one or more weights and per-channel SNR estimate $S\hat{N}R$ (i,j) at pixel (i,j), the control circuitry can calculate an estimate of weight $\hat{v}$ at pixel (i,j) according to:

$$\hat{v}(i,j) = v(S\hat{N}R(i,j)) \quad (11)$$

The control circuitry can then calculate the per-channel recovery kernel based on the estimate of weight $\hat{v}$ and per-channel regularized inverse $h^-$ previously stored in memory 304. For example, the per-channel recovery kernel may be calculated based on:

$$k_{i,j} = k_{avg}\hat{v}(i, j) + \frac{1 - \hat{v}(i, j)}{\mu_{h^-}} h^- \quad (12)$$

where $h^-$ is the regularized inverse of the per-channel PSF (e.g., $h^-$ can be stored in memory 304 during offline process 302), $k_{avg}$ is a per-channel box filter (e.g., a filter that operates to filter the observed signal y in a window S), and $\mu_{h^-}$ is the average value of the $h^-$ samples.

In some embodiments, at per-channel kernel synthesis module 334, the control circuitry can account for estimation noise by adjusting the recovery kernel at lower statistics bound $s_0$ and upper statistics bound $s_1$ (e.g., as stored in memory 304). For example, if the per-channel SNR estimate as calculated in equation (9) is less than lower statistics bound $s_0$, the control circuitry can use a stronger smoothing per-channel recovery kernel. As another example, the control circuitry can clip the per-channel recovery kernel at the upper statistics bound $s_1$, and use the kernel determined for $s_1$ for all SNR estimates greater than $s_1$.

Referring back to decision module 324, if the control circuitry instead determines that a subset of observed signals 316 have color channels corresponding to the cross-channels, the control circuitry can pass the cross-channel subset to offset estimation module 336.

At offset estimation module 336, the control circuitry can determine first order statistic estimate $\hat{\mu}_g$ of the cross-channel subset. For example, the cross-channel subset can include the green1 and green2 pixels in an M×M window S (e.g., M=9) centered at a pixel (i,j) in a pre-determined region. The window selected for the cross-channel subset may be any suitable size. In some embodiments, a larger window S may be used for the cross-channel subset as compared to the per-channel subset because quincunx sampling may reduce the number of samples that can be obtained for a particular window size. For example, referring back to FIG. 2, an illustrative window S can be region 208 in image fragment 200.

In some embodiments, the cross-channel subset can include observed signals $g_1'$ and $g_2'$ from the green1 and green2 color channels (e.g., $g_1'$ and $g_2'$ are provided in equations (1) and (2)). In contrast to the per-channel subset where signal statistics can be directly obtained from observed signals 316, the control circuitry may need to obtain statistics of offset-removed signals $g_1$ and $g_2$ that are not directly accessible to the control circuitry. Thus, the control circuitry may need to estimate the statistics based on the values of observed signals $g_1'$ and $g_2'$. In some embodiments, the control circuitry can calculate first order statistic estimate $\hat{\mu}_g$ in window S of offset-removed signals $g_1$ and $g_2$ according to:

$$\hat{\mu}_g = \frac{\frac{\sum_{i=0}^{n_1-1} g_1'(i)^2}{n_1} + \frac{\sum_{i=0}^{n_2-1} g_2'(i)^2}{n_2}}{2} \quad (13)$$

where $g_1'(i)$ and $g_2'(i)$ are the sample values of the green1 and green2 pixels in window S at pixel (i,j). Persons skilled in the art will appreciate that equation (13) is merely one representation of an estimator that can be used to calculate a first order statistic of the cross-channel subset, and that other suitable estimators can also be used by the control circuitry to determine the first order statistic.

In addition, at offset estimation module 336, the control circuitry can estimate the signal offset r. For the observed signals corresponding to each color channel of the cross-channel subset, the signal offset r can be estimated locally at each pixel (i,j) in a pre-determined region and can be characterized by:

$$r_{G1} = \text{sign}(\mu_{g_1'} - \hat{\mu}_g)\min(\text{abs}(\hat{\mu}_{g_1'} - \hat{\mu}_g), th1) \quad (14)$$

$$r_{G2} = \text{sign}(\mu_{g_2'} - \hat{\mu}_g)\min(\text{abs}(\mu_{g_2'} - \hat{\mu}_g), th2) \quad (15)$$

where $r_{G1}$ and $r_{G2}$ are the signal offset estimates of the observed signals $g_1'$ and $g_2'$ in window S centered at pixel (i,j), respectively, $\mu_{g_1'}$ and $\mu_{g_2'}$ are the first order statistics (e.g. sample means) of the observed signals $g_1'$ and $g_2'$ in window S centered at pixel (i,j), respectively, $\hat{\mu}_g$ is the first order statistic estimate (e.g., an estimate of the sample mean as calculated in equation (13)) of offset-removed signals $g_1$ and $g_2$ in window S centered at pixel (i,j), and th1 and th2 are functions that characteristic of the signal offset. For example, th1 and th2 can be made constant or dependent on field height and imaging conditions to reflect the signal offset's dependence on these factors. After calculating the signal offset, data flow 300 can proceed to cross-channel signal and noise statistics estimator 338.

At cross-channel signal and noise statistics estimator 338, the control circuitry can obtain an estimate of the variance of the cross-channel sensor noise $\hat{\sigma}_w^2$ from noise model adjustment module 322. For example, the control circuitry can transmit first order statistic estimate $\hat{\mu}_g$ of offset-removed signals $g_1$ and $g_2$ (e.g., as calculated in equation (13)) to noise model adjustment module 322.

Thus, at noise model adjustment module 322, the control circuitry can obtain sensor state signals 328 (e.g., channel-dependent analog gain) and first order statistic corresponding to the cross-channel subset (e.g., first order statistic estimate $\hat{\mu}_g$ of offset-removed signals $g_1$ and $g_2$) from cross-channel signal and noise statistics estimator 338. After obtaining sensor state signals 328 and the first order statistic of the observed signals, the control circuitry can estimate the variance of cross-channel sensor noise $\hat{\sigma}_w^2$. For example, at a pixel (i,j) where window S is centered, an estimate of the variance of the cross-channel sensor noise $\hat{\sigma}_w^2$ can be described by:

$$\hat{\sigma}_w^2 = f(\hat{\mu}_g, \text{analogue\_gain}_l) \quad (16)$$

where l indexes the color channel (e.g., green1 or green2 color channel), analogue_gain$_l$ is the analog gain of color channel l, and f is the parameterization of the sensor noise model. In some cases, because the green1 and green2 color channels may have a common analog gain, the values of analogue_gain$_l$ may be the same for both the green1 and green2 color channels. In some embodiments, because the parameterization of the sensor noise model can be determined uniquely for a sensor (e.g., sensor 104 of FIG. 1), the same parameterization can be used for both cross-channel focus recovery and per-channel focus recovery. In addition, since the sensor noise statistics are calculated for each local region in an image, the estimated sensor noise can be signal-dependent.

Returning back to cross-channel signal and noise statistics estimator 338, based on the estimate of the variance of the cross-channel sensor noise $\hat{\sigma}_w^2$, the control circuitry can calculate a cross-channel SNR estimate at each pixel (i,j) of the cross-channel subset. For example, the control circuitry can first calculate a second order statistic estimate $\hat{\sigma}_g^2$ in window S of offset-removed signals $g_1$ and $g_2$. The second order statistic estimate $\hat{\sigma}_g^2$ can be characterized by:

$$\hat{\sigma}_g^2 = \frac{\frac{\sum_{i=0}^{n_1-1} g_1'(i)}{n_1} + \frac{\sum_{i=0}^{n_2-1} g_2'(i)}{n_2}}{2} - \hat{\mu}_g^2 \quad (17)$$

Persons skilled in the art will appreciate that equation (17) is merely one representation of an estimator that can be used to calculate a second order statistic of the cross-channel subset, and that other suitable estimators can also be used by the control circuitry to determine the second order statistic. Factors that may be relevant in the choice of estimators may include, for example, considerations of estimator bias and estimator variance.

Then, based on the second order statistic estimate $\hat{\sigma}_g^2$ and the estimate of the variance of the cross-channel sensor noise $\hat{\sigma}_w^2$ (e.g., as calculated in equation (16)), the control circuitry can determine an estimate of the cross-channel variance of the original signal $\hat{\sigma}_x^2$ at each pixel (i,j) where window S is centered according to:

$$\hat{\sigma}_x^2 = \frac{\hat{\sigma}_g^2 - \hat{\sigma}_w^2}{\gamma_h} \quad (18)$$

where) $\gamma_h$ is the additional cross-channel blurring constant calculated for a pre-determined region where pixel (i,j) is located, and $\hat{\sigma}_g^2$ is an estimate of the sample variance in window S of offset-removed signals $g_1$ and $g_2$. As described in offline process 302, $\gamma_h$ may be pre-computed and stored in memory 304. In some embodiments, given the estimated cross-channel variance of the original signal $\hat{\sigma}_x^2$ and the estimated variance of the cross-channel sensor noise $\hat{\sigma}_w^2$, the cross-channel SNR estimate $S\hat{N}R_{XFR}$ (i,j) at pixel (i,j) in an M×M window S (e.g., M=9) can be represented by:

$$S\hat{N}R_{XFR}(i,j) = \frac{\hat{\sigma}_x^2}{\hat{\sigma}_w^2} \quad (19)$$

After calculating the cross-channel SNR estimate $S\hat{N}R_{XFR}$ (i,j), data flow 300 may move to TEF 330, cross-channel Variable Statistics Decision (VSD) module 340, or cross-channel kernel synthesis module 342 based on one or more system settings. For example, the application of TEF 330 may depend on a TEF system setting. For instance, if TEF system setting is set to "ON", the control circuitry can apply a targeted edge filter (TEF) 330 to pre-process the signals prior to applying the cross-channel recovery kernel. In some embodiments, TEF 330 can be applied only when $S\hat{N}R_{XFR}$ (i,j) exceeds a pre-determined threshold.

Optionally, if the TEF system setting is set to "OFF", the control circuitry can bypass TEF 330 and data flow 300 may move either to cross-channel VSD module 340 or cross-channel kernel synthesis module 342 depending on a VSD system setting of the imaging system. Persons skilled in the art will appreciate that cross-channel VSD module 340 can optionally be applied before TEF 330.

In some embodiments, if the VSD system setting is set to "ON", at cross-channel VSD module 340, the control circuitry can compute an additional cross-channel SNR estimate at pixel (i,j). For example, at cross-channel signal and noise statistics estimator 338, the control circuitry may have used a window of size M=9 to compute a first cross-channel SNR estimate $S\hat{N}R_{9\times9}$(i,j) at pixel (i,j). Accordingly, at cross-channel VSD module 340, the control circuitry may use a smaller window (e.g., a window of size M=5) to compute a second cross-channel SNR estimate $S\hat{N}R_{5\times5}$(i,j) at pixel (i,j). The smaller window can be centered at the same pixel as the larger window. For example, referring back to FIG. 2, an illustrative smaller window (e.g. window of size M=5) can be region 210 in image fragment 200. In some embodiments, the control circuitry can compute the second cross-channel SNR estimate in cross-channel signal and noise statistics estimator 338.

Furthermore, the control circuitry can use a decision process to select which cross-channel SNR estimate to use for calculating the cross-channel recovery kernel at pixel (i,j). The decision process can be defined as follows:

If $S\hat{N}R_{9\times9}(i,j) < s_0 \wedge S\hat{N}R_{9\times9}(i,j) < S\hat{N}R_{5\times5}(i,j)$   (20)

$S\hat{N}R_{XFR}(i,j) = S\hat{N}R_{9\times9}(i,j)$ else $S\hat{N}R_{XFR}(i,j) = S\hat{N}R_{5\times5}(i,j)$ end The cross-channel SNR estimate resulting from the decision process can be used to calculate the cross-channel recovery kernel of the cross-channel subset.

Figure 4:
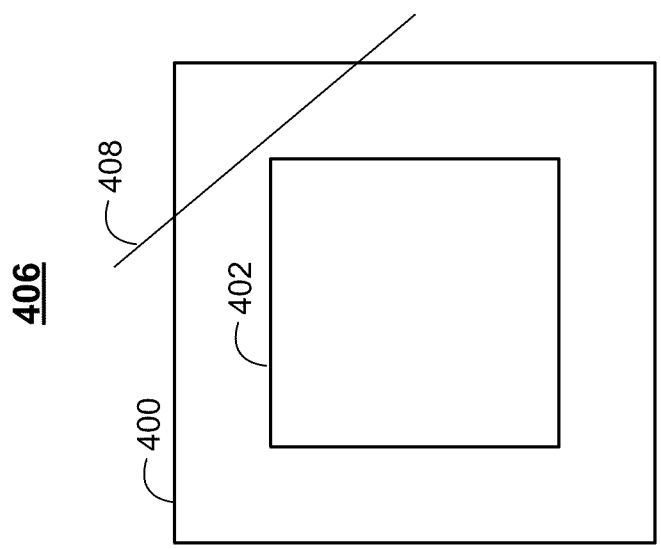
FIG. 4 illustrates various windows which can be used to compute additional signal statistics in accordance with embodiments of the invention.
Figure 4:
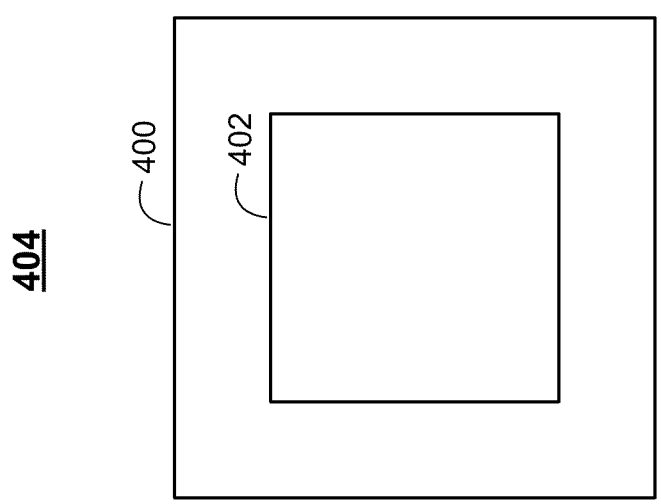

The relative values of the cross-channel SNR estimates (e.g., $S\hat{N}R_{5\times5}$(i,j) and $S\hat{N}R_{9\times9}$(i,j)) may be dependent on a number of factors related to imaging content. For example, referring to FIG. 4, window 400 may be a window of size M=9, which can be used by the control circuitry to compute the first cross-channel SNR estimate $S\hat{N}R_{9\times9}$(i,j). In addition, window 402 may be a window of size M=5, which can be used by the control circuitry to compute the second cross-channel SNR estimate $S\hat{N}R_{5\times5}$(i,j). For a flat region, such as region 404, the control circuitry can use the decision process to select the first cross-channel SNR estimate $S\hat{N}R_{9\times9}$(i,j). By selecting $S\hat{N}R_{9\times9}$(i,j), the resulting cross-channel recovery kernel can be applied to a larger window and thus may eliminate more spurious noise in the flat region. On the other hand, for a region with one or more edges, such as region 406, the control circuitry can use the decision process to select the second cross-channel SNR estimate $S\hat{N}R_{5\times5}$(i,j). By selecting $S\hat{N}R_{5\times5}$(i,j), the control circuitry can provide for better processing of the one or more edges (e.g., edge 408) in region 406. In contrast, if cross-channel VSD module 340 was turned off and the first cross-channel SNR estimate $S\hat{N}R_{9\times9}$ (i,j) was used instead, $S\hat{N}R_{9\times9}$(i,j) may detect edge 408 earlier than desired. Thus, by selecting $S\hat{N}R_{5\times5}$(i,j) as the cross-channel SNR estimate, the control circuitry can more closely approximate the location of the one or more edges, which may provide for better edge detection in region 406.

After determining which cross-channel SNR estimate to use at cross-channel VSD module 340, data flow 300 may move to cross-channel kernel synthesis module 342. Alternatively, if the VSD system setting is set to "OFF", the control circuitry may bypass cross-channel VSD module 340 and move directly to cross-channel kernel synthesis module 342.

At cross-channel kernel synthesis module 342, the control circuitry can calculate a cross-channel recovery kernel. For example, the control circuitry can receive information associated with one or more weights from memory 304. Based on the information associated with the one or more weights and cross-channel SNR estimate $S\hat{N}R_{XFR}$(i,j) at pixel (i,j), the control circuitry can calculate an estimate of weight $\hat{v}_{XFR}$ at pixel (i,j) according to:

$$\hat{v}_{XFR}(i,j) = v_{XFR}(S\hat{N}R_{XFR}(i,j)) \quad (21)$$

The control circuitry can then calculate the cross-channel recovery kernel based on the estimate of weight $\hat{v}_{XFR}$ and cross-channel regularized inverse $h_{XFR}^-$ (e.g., $h_{XFR}^-$ can be previously stored in memory 304). For example, the cross-channel recovery kernel may be calculated based on:

$$k_{XFR} = k_{avg}\hat{v}_{XFR} + \frac{1-\hat{v}_{XFR}}{\mu_{h_{XFR}^-}}h_{XFR}^- \quad (22)$$

where $h_{XFR}^-$ is the regularized inverse of the cross-channel PSF (e.g., $h_{XFR}^-$ can be stored in memory 304 during offline process 302), $k_{avg}$ is a cross-channel box filter (e.g., a filter that operates to filter offset-removed signals $g_1$ and $g_2$ in a window S), and, $\mu_{h_{XFR}^-}$ is the average value of the $h_{XFR}^-$ samples.

In some embodiments, at cross-channel kernel synthesis module 342, the control circuitry can account for estimation noise by adjusting the recovery kernel at lower statistics bound $s_0$ and upper statistics bound $s_1$ (e.g., as stored in memory 304). For example, if the cross-channel SNR estimate as calculated in equation (19) is less than lower statistics bound $s_0$, the control circuitry can use a stronger cross-channel smoothing kernel. As another example, the control circuitry can clip the cross-channel recovery kernel at the upper statistics bound $s_1$.

Persons skilled in the art will appreciated that the recovery kernels of the cross-channel and per-channel subsets can be represented using any suitable form. The form of the recovery kernel may depend on one or more factors including, for example, the types of filters selected to estimate the recovery kernel, one or more assumptions about the sensor noise, the observed signal, the properties of PSFs 314, and/or any combination thereof.

After calculating the recovery kernel at either per-channel kernel synthesis module 334 or cross-channel kernel synthesis module 342, data flow 300 may move to focus recovery module 344. At focus recovery module 344, the control circuitry can apply the recovery kernel to the per-channel and cross-channel subsets.

For example, for per-channel focus recovery, the control circuitry can generate a recovered signal 346 by applying per-channel recovery kernel $k_{i,j}$ to an observed signal in the window S centered at pixel (i,j). For example, the control circuitry can perform a convolution of size M×M at pixel (i,j) according to:

$$\hat{x}_{i,j} = k_{i,j} * y_s \quad (23)$$

where $\hat{x}_{i,j}$ is the recovered signal, and $y_S$ is the observed signal in window S.

As another example, for cross-channel focus recovery, the control circuitry can generate recovered signals 346 by applying cross-channel recovery kernel $k_{XFR}$ to the offset-removed signals $g_1$ and $g_2$. Since the signal offset estimates $r_{G1}$ and $r_{G2}$ were computed in equations (14) and (15), respectively, the control circuitry can remove the signal offset estimates $r_{G1}$ and $r_{G2}$ from the observed signals $g_1'$ and $g_2'$ according to:

$$g_1 = g_1' - r_{G1}, \quad (24)$$

$$g_2 = g_2' - r_{G2} \quad (25)$$

where $g_1$ and $g_2$ are offset-removed signals from the green1 and green2 color channels, respectively, $g_1'$ and $g_2'$ are observed signals from the green1 and green2 color channels, respectively, and $r_{G1}$ and $r_{G2}$ are the signal offset estimates of the observed signals $g_1'$ and $g_2'$ in window S centered at pixel (i,j), respectively. In some embodiments, the offset-removed signals $g_1$ and $g_2$ in window S can be represented by:

$$g_s = \{g_1, g_2\} \quad (26)$$

After generating the offset-removed signals $g_1$ and $g_2$, the control circuitry can generate recovered signals 346 by applying the cross-channel recovery kernel $k_{XFR}$ to the offset-removed signals $g_1$ and $g_2$ in the window S centered at pixel (i,j). For example, the control circuitry can perform a cross-channel convolution of size M×M at pixel (i,j) according to:

$$\hat{x}(i,j) = k_{XFR} * g_s \quad (27)$$

where $\hat{x}(i,j)$ are the recovered signals.

FIGS. 5-8 are flowcharts of illustrative processes that can be executed by an imaging system (e.g., imaging system 100 of FIG. 1) to achieve some of the above-described features and functionalities. In particular, the processes may be executed by a control circuitry configured in accordance with embodiments of the invention, such as control circuitry 106 of FIG. 1. It should be understood that these processes are merely illustrative, and that any steps can be removed, modified, combined, or any steps may be added, without departing from the scope of the invention.

Figure 5:
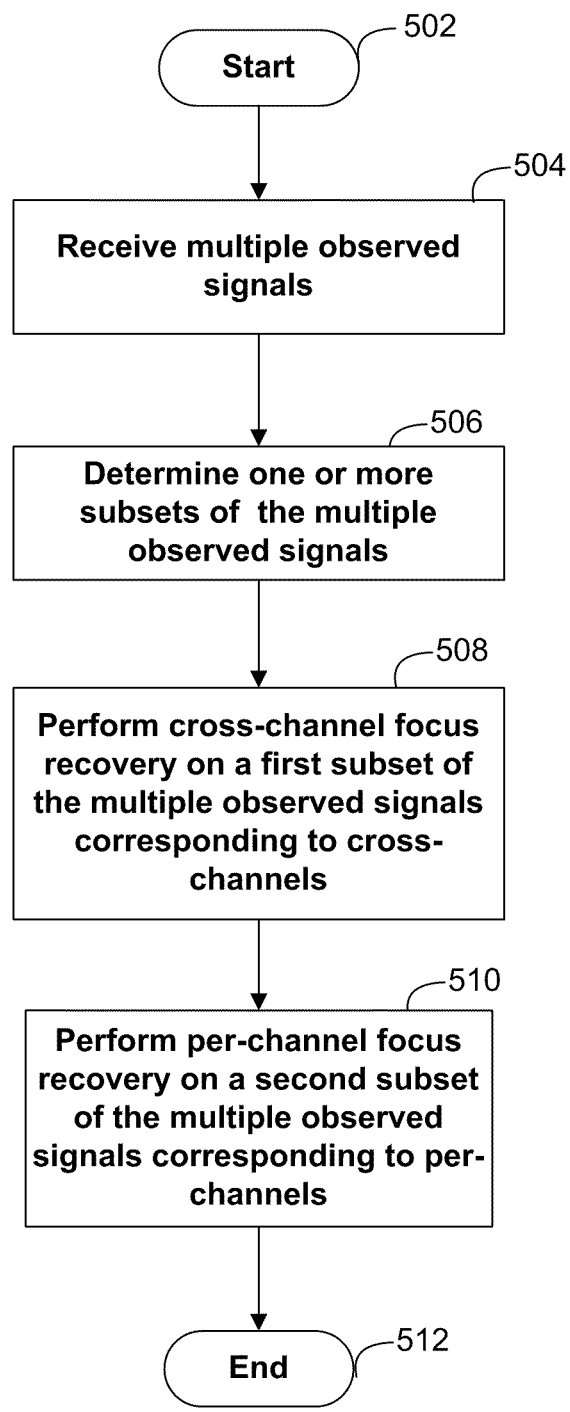
FIG. 5 is a flowchart of an illustrative process for processing an image using per-channel and cross-channel focus recovery of an imaging system in accordance with embodiments of the invention.

Referring first to FIG. 5, process 500 is shown for processing an image using per-channel and cross-channel focus recovery of the imaging system in accordance with embodiments of the invention. Process 500 begins at step 502. At step 504, the control circuitry can receive multiple observed signals. For example, the control circuitry can receive multiple observed signals (e.g., observed signals 316 of FIG. 3) from an observed image (e.g., observed image 110 of FIG. 1) generated by a sensor (e.g., sensor 104 of FIG. 1).

Then, at step 506, the control circuitry can determine one or more subsets of the multiple observed signals. For example, the control circuitry can determine a first subset of multiple observed signals that have color channels corresponding to the green1 and green2 color channels. In addition, the control circuitry can determine a second subset of multiple observed signals that have color channels corresponding to the red and blue color channels.

Then, at step 508, the control circuitry can perform cross-channel focus recovery on the first subset of the multiple observed signals. For example, the control circuitry can perform cross-channel focus recovery on the observed signals from the green1 and green2 color channels. For instance, the control circuitry can first perform lens shading correction on the observed signals from the green1 and green2 color channels. After performing lens shading correction, the control circuitry can generate a recovered signal by removing cross-channel blurring and cross-channel sensor noise from the first subset of the multiple observed signals. After performing cross-channel focus recovery on the first subset of the multiple observed signals, process 500 may move to step 510.

At step 510, the control circuitry can perform per-channel focus recovery on the second subset of the multiple observed signals. For example, the control circuitry can perform per-channel focus recovery on observed signals from the red and blue color channels. For instance, the control circuitry can first perform lens shading correction on the observed signals from the red and blue color channels. After performing lens shading correction, the control circuitry can generate a recovered signal by separately processing each observed signal (e.g., by removing per-channel blurring and per-channel sensor noise from each signal). After performing per-channel focus recovery on the second subset of the multiple observed signals, process 500 may end at step 512.

Figure 6A:
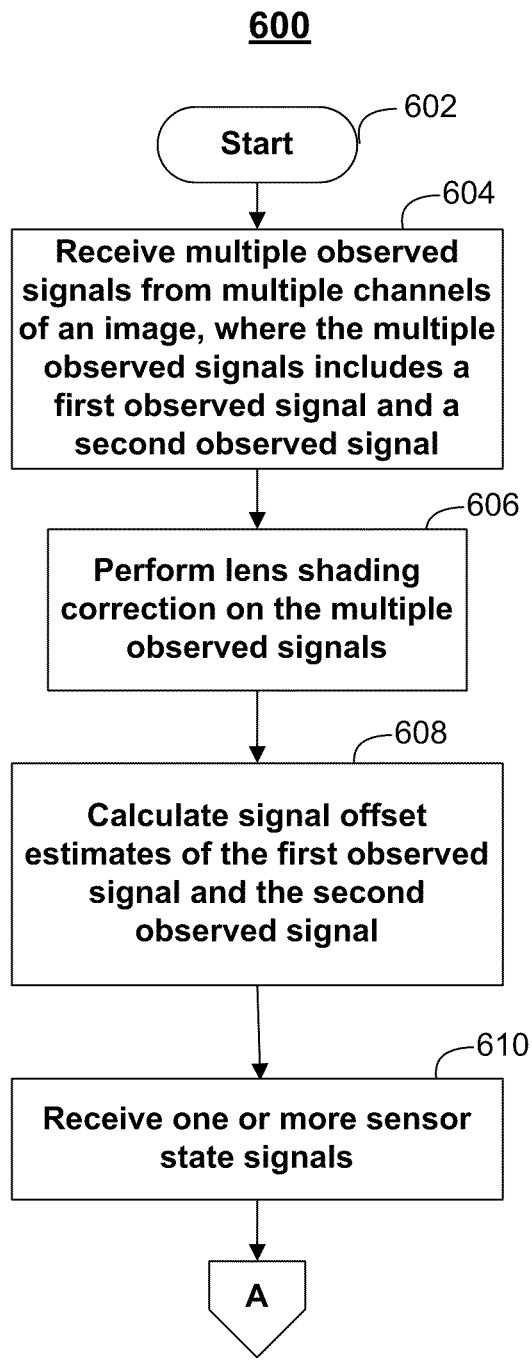
FIGS. 6A-6C is a flowchart of an illustrative process for cross-channel focus recovery of an imaging system in accordance with one embodiment of the invention.
Figure 6B:
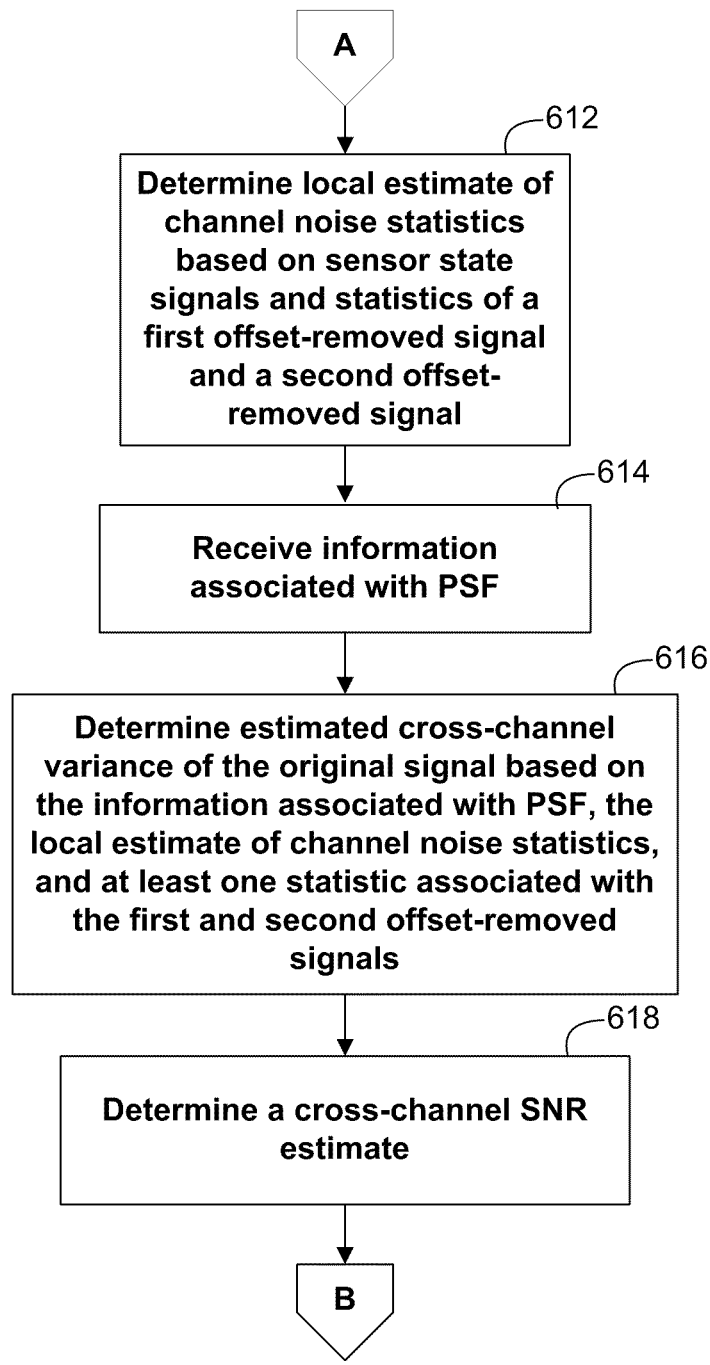
Figure 6C:
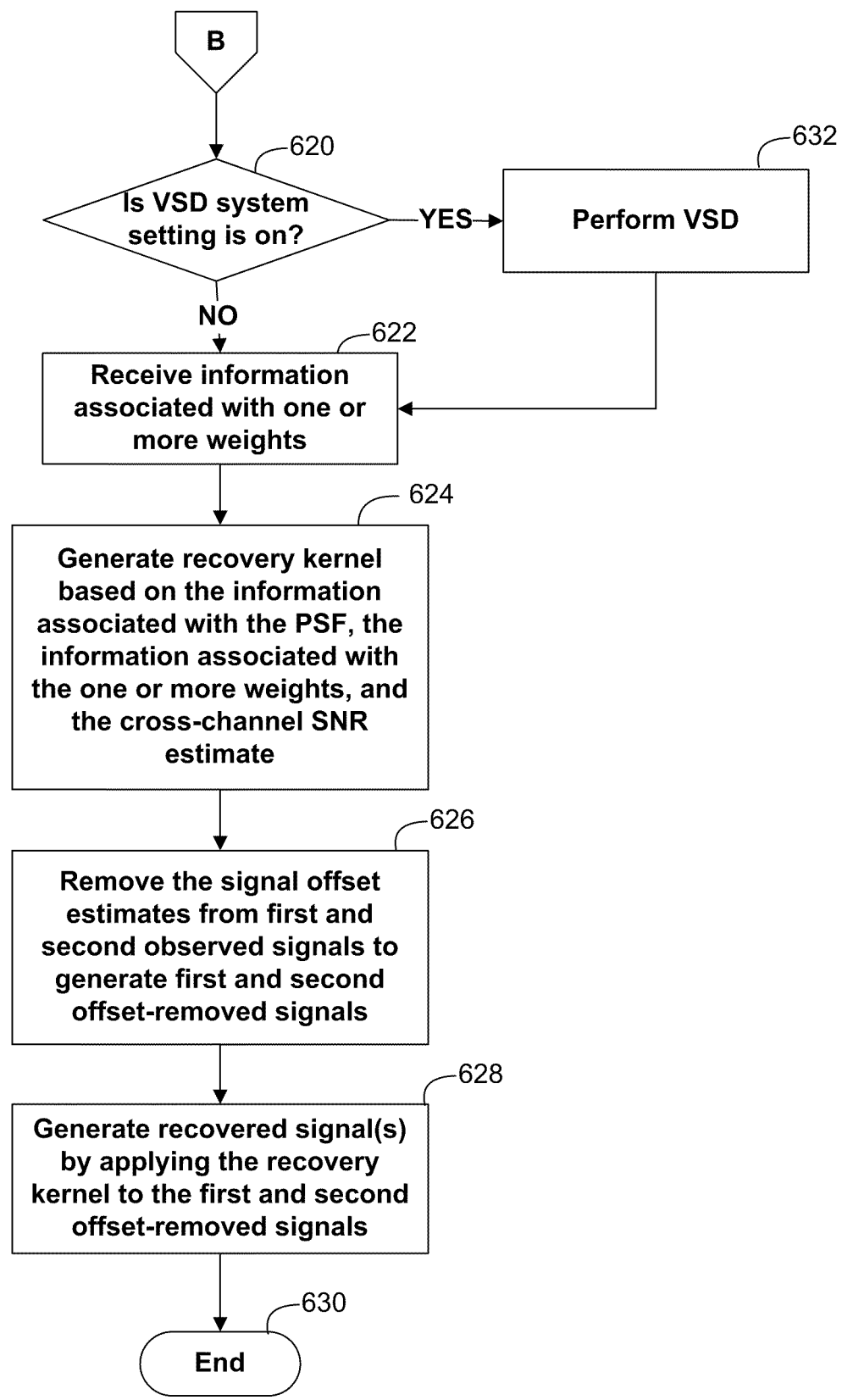

Turning now to FIGS. 6A-6C, process 600 is shown for performing cross-channel focus recovery on observed signals of an imaging system (e.g., imaging system 100 of FIG. 1) in accordance with one embodiment of the invention. In some embodiments, process 600 can be implemented in step 508 of process 500 (FIG. 5).

Process 600 may begin at step 602. At step 604, the control circuitry can receive multiple observed signals from multiple channels of an image (e.g., a Bayer-pattern image), where the multiple observed signals includes a first observed signal and a second observed signal. For example, for a window in the Bayer-pattern image, the control circuitry can receive a first observed signal $g_1'$ from a green1 color channel and a second observed signal $g_2'$ from a green2 color channel in the window. In some embodiments, the Bayer-pattern image may be an observed image (e.g., observed image 110 of FIG. 1) generated by a sensor (e.g., sensor 104 of FIG. 1) of the imaging system.

At step 606, the control circuitry can perform lens shading correction on the multiple observed signals. For example, at a lens shading correction module of the imaging system (e.g., lens shading correction module 320 of FIG. 3), the control circuitry can use lens shading correction to reduce the effects of a signal offset of the multiple observed signals. After performing the lens shading correction, process 600 may move to step 608.

At step 608, the control circuitry can calculate signal offset estimates of the first and second observed signals. For example, at an offset estimation module of the imaging system (e.g., offset estimation module 336 of FIG. 3), the control circuitry can calculate signal offset estimates $r_{G1}$ and $r_{G2}$ locally at each pixel (i,j) in a window of the observed image. After calculating the signal offset estimates, process 600 may move to step 610.

At step 610, the control circuitry can receive one or more sensor state signals. For example, the control circuitry can receive sensor state signals 328 of FIG. 3 from the sensor. The sensor state signals (e.g., channel-dependent analog gain) can provide an indication of imaging conditions. After receiving the one or more sensor state signals, process 600 may then move to step 612.

Then, at step 612, the control circuitry can determine a local estimate of channel noise statistics based on the sensor state signals and a first offset-removed signal and a second offset-removed signal. For example, based on the channel-dependent analog gain and the first order statistic estimate $\hat{\mu}_g$ of the first and second offset-removed signals, the control circuitry can generate a local estimate of channel noise statistics using a parameterization of a sensor noise model. In some embodiments, the local estimate of channel noise statistics can be second order statistics of the cross-channel sensor noise (e.g., estimated variance of the cross-channel sensor noise $\hat{\sigma}_w^2$ of each color channel) at each pixel in a window of the observed image. After determining the local estimate of channel noise statistics, process 600 may move to step 614.

At step 614, the control circuitry can receive information associated with the PSF from memory (e.g., memory 112 of FIG. 1 or memory 304 of FIG. 3) of the imaging system. Thus, for each pixel in the window, the control circuitry can determine the pre-determined region that the pixel is located in (e.g., region 206 of FIG. 2 can represent one such pre-determined region). Based on the pre-determined region, the control circuitry can obtain information associated with the PSF for that particular pre-determined region in the observed image. The information received from memory can include any suitable information associated with the cross-channel PSF including, for example, the regularized inverse $h_{XFR}^-$ of the cross-channel PSF $h_{XFR}$ and additional cross-channel blurring constant $\gamma_h$. In some embodiments, the information associated with the PSF can be calculated during offline process 302 of FIG. 3.

Then, at step 616, the control circuitry can determine an estimate of the cross-channel variance of the original signal based on the information associated with the PSF, the local estimate of channel noise statistics, and statistics associated with the first and second offset-removed signals. For example, for each pixel in a window, the control circuitry can compute the estimated cross-channel variance of the original signal $\hat{\sigma}_x^2$ based on additional cross-channel blurring constant $\gamma_h$, the estimated variance of the cross-channel sensor noise $\hat{\sigma}_w^2$ in the window, and an estimate of the second order cross-channel statistic $\hat{\sigma}_g^2$ of the first and second offset-removed signals in the window (e.g., as calculated in equation (17)).

Continuing to step 618, the control circuitry can determine a cross-channel SNR estimate. For example, the control circuitry can generate the cross-channel SNR estimate in the window by taking a ratio between the estimated cross-channel variance of the original signal $\hat{\sigma}_x^2$ and the estimated variance of the cross-channel sensor noise $\hat{\sigma}_w^2$. After determining the cross-channel SNR estimate, process 600 moves to step 620.

At step 620, the control circuitry can determine whether the VSD system setting is on. If, at step 620, the control circuitry determines that the VSD system setting is off, process 600 may move to step 622. At step 622, the control circuitry can receive information associated with one or more weights from the memory. For example, the information associated with the one or more weights can be a function of SNR at each pixel in an image. In some embodiments, the information associated with one or more weights can be calculated during offline process 302 of FIG. 3.

Then, at step 624, the control circuitry can generate a cross-channel recovery kernel based on the information associated with the cross-channel PSF, the information associated with the one or more weights, and the cross-channel SNR estimate. The cross-channel recovery kernel can be a spatial filter that can provide information for removing lens blurring and sensor noise. For example, the control circuitry can first determine a weight for the cross-channel SNR estimate using the information associated with the one or more weights. Based on the weight, the control circuitry can then perform a linear combination of a box filter and the regularized inverse $h_{XFR}^-$. After generating the cross-channel recovery kernel, process 600 may move to step 626.

At step 626, the control circuitry can remove the signal offset estimates from the first and second observed signals to generate the first offset-removed signal and the second offset-removed signal. Then, at step 628, the control circuitry can generate one or more recovered signals by applying the cross-channel recovery kernel to the first and second offset-removed signals. For example, the control circuitry can perform a cross-channel convolution between the cross-channel recovery kernel and the first and second offset-removed signals to generate the one or more recovered signals (e.g., recovered signals 346 of FIG. 3). Process 600 may then move to step 630 and end.

Returning to step 620, if the control circuitry instead determines that the VSD system setting is on, process 600 may move to step 632. At step 632, the control circuitry can perform VSD by computing an additional cross-channel SNR estimate. For example, the control circuitry can calculate the additional cross-channel SNR estimate by using a window of a smaller size than the window used to calculate the cross-channel SNR estimate at step 618. After calculating the additional cross-channel SNR estimate, the control circuitry can use a decision process to select which cross-channel SNR estimate to use for calculating the cross-channel recovery kernel. This decision process may be based on the relative values of the cross-channel SNR estimates. After performing the VSD, process 600 may move to step 622, as discussed previously.

Figure 7A:
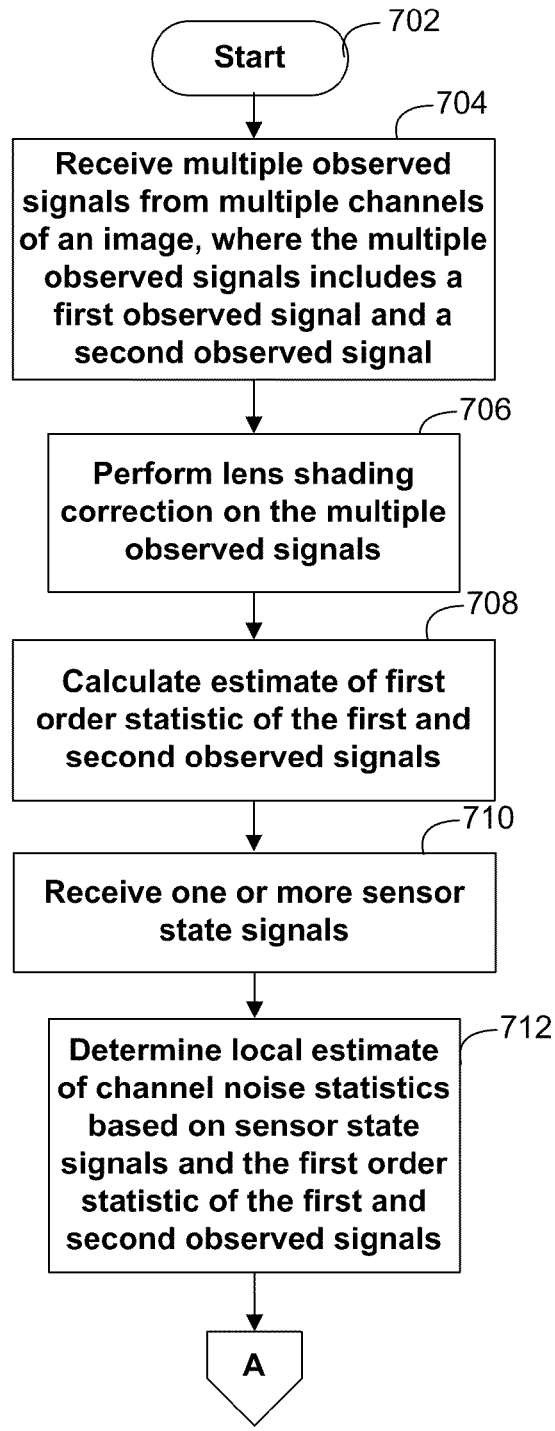
FIGS. 7A and 7B is a flowchart of an illustrative process for focus recovery of an imaging system in accordance with another embodiment of the invention.
Figure 7B:
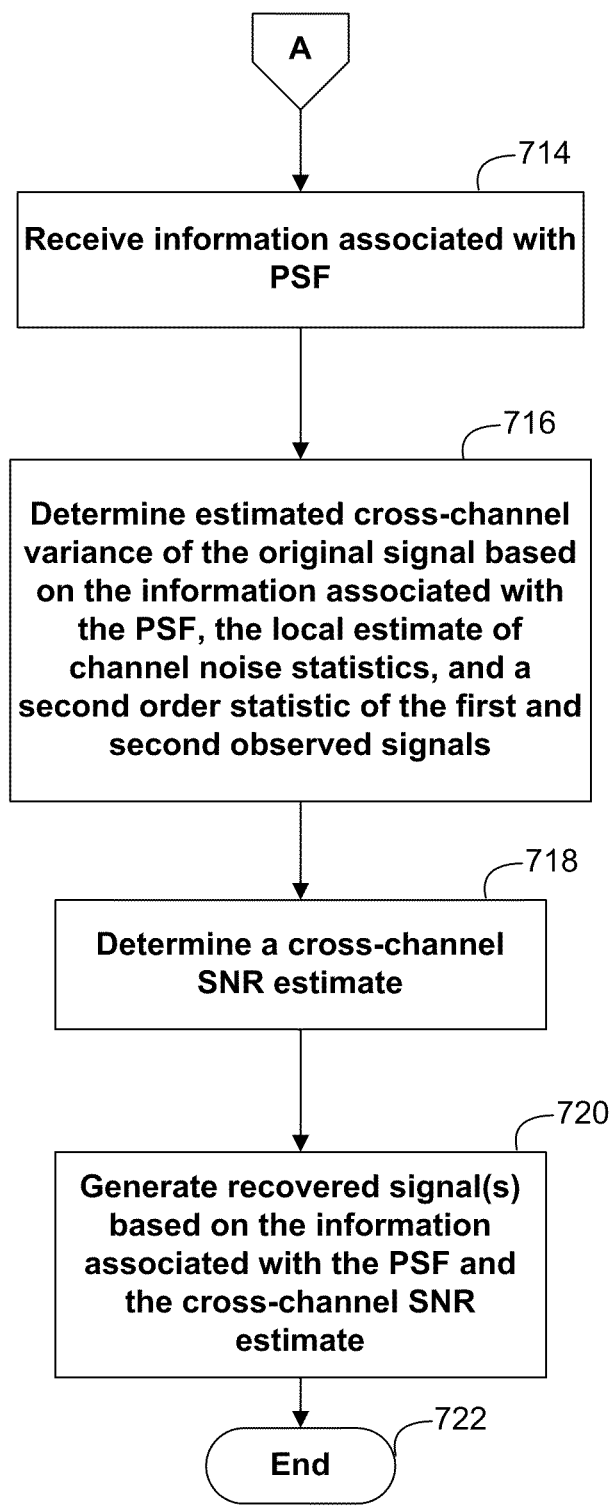

Turning now to FIGS. 7A and 7B, process 700 is shown for performing focus recovery on observed signals of an imaging system (e.g., imaging system 100 of FIG. 1) in accordance with another embodiment of the invention.

Process 700 may begin at step 702. At step 704, the control circuitry can receive multiple observed signals from multiple channels of an image (e.g., a Bayer-pattern image), where the multiple observed signals includes a first observed signal and a second observed signal. For example, for a window in the Bayer-pattern image, the control circuitry can receive a first observed signal $g_1'$ from a green1 color channel and a second observed signal $g_2'$ from a green2 color channel in the window. In some embodiments, the Bayer-pattern image may be an observed image (e.g., observed image 110 of FIG. 1) generated by a sensor (e.g., sensor 104 of FIG. 1) of the imaging system.

At step 706, the control circuitry can perform lens shading correction on the multiple observed signals. For example, at a lens shading correction module of the imaging system (e.g., lens shading correction module 320 of FIG. 3), the control circuitry can use lens shading correction to reduce the effects of a signal offset of the multiple observed signals. After performing the lens shading correction, process 700 may move to step 708.

At step 708, control circuitry (e.g., control circuitry 106 of FIG. 1) of the imaging system can calculate an estimate of first order statistic of the first and second observed signals. For example, the control circuitry can calculate the estimate of the first order statistic by calculating a first local sample mean of first observed signal $g_1'$ and a second local sample mean of second observed signal $g_2'$. The control circuitry can then average the first and second local sample means to generate the first order statistic of the first and second observed signals. By averaging the first and second local sample means, a signal offset of the first and second observed signals can be automatically removed from the first order statistic. Thus, the control circuitry may not have to explicitly calculate the signal offset of the first and second observed signals (e.g., as in step 608 of process 600 of FIG. 6). In addition, because the control circuitry can use a larger number of pixels to calculate the first order statistic, the control circuitry can improve noise reduction in the focus recovery process.

Then, at step 710, the control circuitry can receive one or more sensor state signals. For example, the control circuitry can receive sensor state signals 328 of FIG. 3 from the sensor. The sensor state signals (e.g., channel-dependent analog gain) can provide an indication of imaging conditions. After receiving the one or more sensor state signals, process 700 may then move to step 712.

At step 712, the control circuitry can determine a local estimate of channel noise statistics based on the sensor state signals and the first order statistic of the first and second observed signals. For example, based on the channel-dependent analog gain and the first order statistic estimate of the first and second observed signals, the control circuitry can generate a local estimate of channel noise statistics using a parameterization of a sensor noise model. After determining the local estimate of channel noise statistics, process 700 may move to step 714.

At step 714, the control circuitry can receive information associated with the PSF from memory (e.g., memory 112 of FIG. 1 or memory 304 of FIG. 3) of the imaging system. For example, for each pixel in the window, the control circuitry can determine the pre-determined region that the pixel is located in (e.g., region 206 of FIG. 2 can represent one such pre-determined region). Based on the pre-determined region, the control circuitry can obtain information associated with the PSF for that particular pre-determined region in the observed image. In some embodiments, the information associated with the PSF can be calculated during offline process 302 of FIG. 3.

Then, at step 716, the control circuitry can determine an estimate of the cross-channel variance of the original signal based on the information associated with the PSF, the local estimate of channel noise statistics, and an estimate of second order statistic of the first and second observed signals. For example, the control circuitry can generate the estimate of the second order statistic of the first and second observed signals by calculating a variance of the first and second observed signals. In some embodiments, because the second order statistic of the first and second observed signals may include a signal offset of the first and second observed signals, the control circuitry may need to compensate for the signal offset. For instance, the control circuitry can average local sample variances of the first and second observed signals and subtract a square of an estimate of the signal offset. As a result, the control circuitry can estimate the second order statistic of the first and second observed signals without explicitly removing a signal offset from each observed signal.

Continuing to step 718, the control circuitry can determine a cross-channel SNR estimate. After determining the cross-channel SNR estimate, process 700 moves to step 720.

At step 720, the control circuitry can generate one or more recovered signals based on the information associated with the PSF and the cross-channel SNR. In some embodiments, the control circuitry can perform cross-channel focus recovery. For example, the control circuitry can first generate a cross-channel recovery kernel based on the information associated with the PSF received from memory (e.g., memory 112 of FIG. 1 or memory 304 of FIG. 3), information associated with one or more weights received from memory (e.g., memory 112 of FIG. 1 or memory 304 of FIG. 3), and the cross-channel SNR estimate. For instance, the control circuitry can generate the cross-channel recovery kernel by determining a weight for the cross-channel SNR estimate using the information associated with the one or more weights. Based on the determined weight, the control circuitry can then perform a linear combination of a box filter and a cross-channel regularized inverse $h_{XFR}^-$. Then, after generating the cross-channel recovery kernel, the control circuitry can perform a cross-channel convolution between the cross-channel recovery kernel and the first and second observed signals to generate one or more recovered signals.

In other embodiments, the control circuitry can perform hybrid focus recovery on the first and second observed signals. For example, the control circuitry can first generate a hybrid-channel recovery kernel based on information associated with the PSF, information associated with one or more weights, and the cross-channel SNR estimate. For instance, the control circuitry can generate the hybrid-channel recovery kernel by determining a weight for the cross-channel SNR estimate using the information associated with the one or more weights. Based on the determined weight, the control circuitry can then perform a linear combination of a box filter and a per-channel regularized inverse $h^-$. After generating the hybrid-channel recovery kernel, the control circuitry can perform a first convolution between the hybrid-channel recovery kernel and the first observed signal to generate a first recovered signal. In addition, the control circuitry can perform a second convolution between the hybrid-channel recovery kernel and the second observed signal to generate a second recovered signal. Process 700 may then move to step 722 and end.

Figure 8:
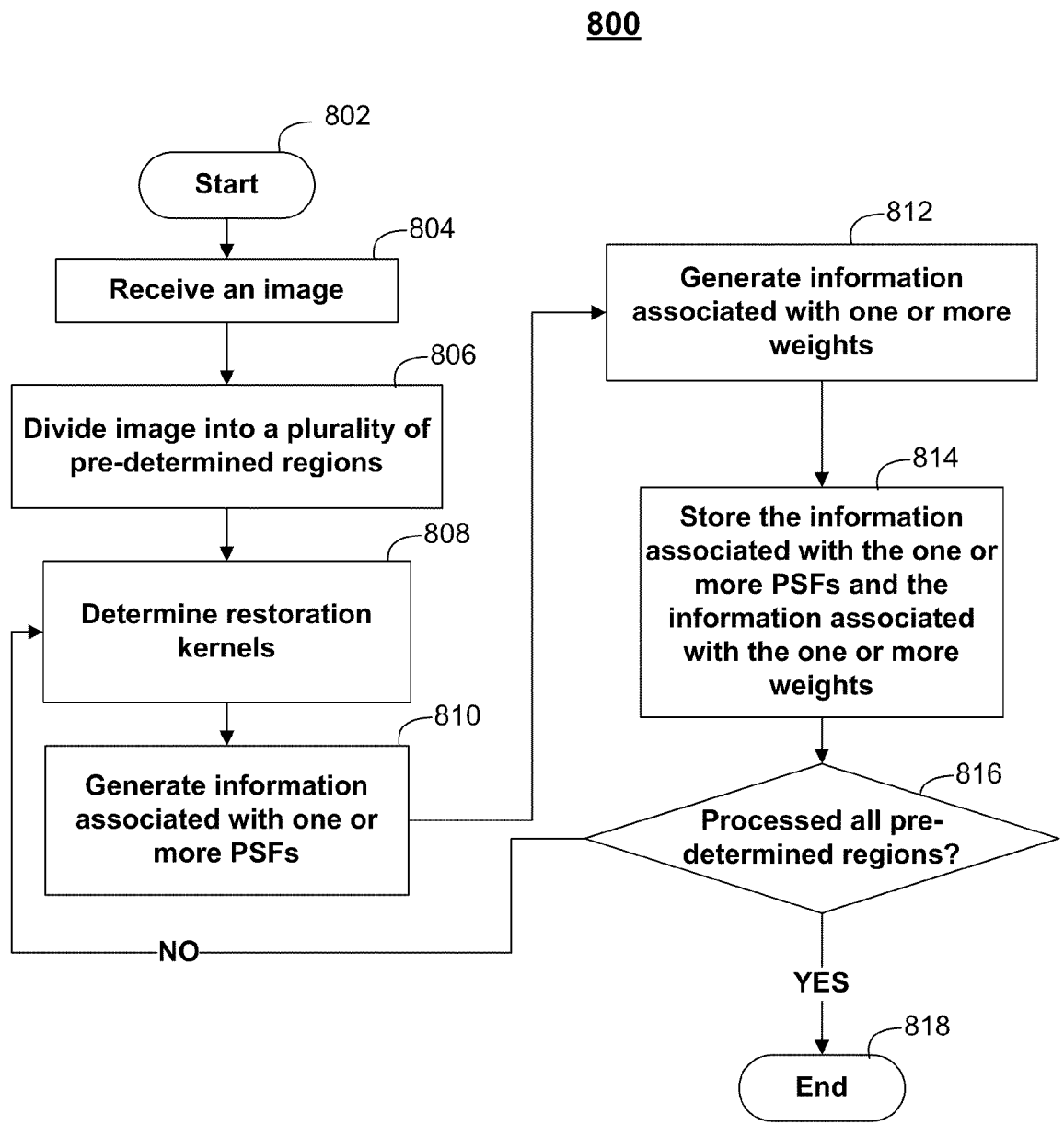
FIG. 8 is a flowchart of an illustrative process for offline processing of an image of an imaging system in accordance with embodiments of the invention.

FIG. 8 is a flowchart of an illustrative process 800 for offline processing of an image of the imaging system. Process 800 may begin at step 802. At step 804, the control circuitry can receive an image (e.g., observed image 110 of FIG. 1) from a sensor (e.g., sensor 104 of FIG. 1) of the imaging system. After receiving the image, process 800 may move to step 806.

At step 806, the control circuitry can divide the image into multiple pre-determined regions. For example, region 206 of FIG. 2 can represent one such pre-determined region in image fragment 200. Process 800 may then move to step 808.

At step 808, for a pre-determined region in the image, the control circuitry can determine restoration kernels for both a per-channel subset and a cross-channel subset. After determining the restoration kernels, process 800 may move to step 810.

At step 810, the control circuitry can generate information associated with one or more PSFs. For example, for both per-channel focus recovery and cross-channel focus recovery, the control circuitry can receive one or more PSFs (e.g., PSFs 314 of FIG. 3). Based on the one or more PSFs, the control circuitry can determine information associated with the one or more PSFs. The information associated with the PSF can include, for instance, regularized inverses of the per-channel and cross-channel PSFs, blurring constants of the per-channel and cross-channel PSFs, and an SNR interval (e.g., SNR interval 308 of FIG. 3).

Then, at step 812, the control circuitry can generate information associated with one or more weights. For example, for both per-channel focus recovery and cross-channel focus recovery, the control circuitry can determine a best fit of a parameterization of the restoration kernels. The control circuitry can then determine a best fit of the parameterization of the restoration kernels based on the regularized inverse of the PSF, a box filter, and SNR samples. For instance, the control circuitry can determine one or more weights for matching a linear combination of the regularized inverse of the PSF and the box filter to the restoration kernels. In response to determining the one or more weights, the control circuitry can generate information associated with the one or more weights (e.g., coefficients) that can represent the variation of the one or more weights as a function of the SNR.

Continuing to step 814, the control circuitry can store the information associated with the one or more PSFs and the information associated with the one or more weights in memory (e.g., memory 112 of FIG. 1 or memory 304 of FIG. 3).

At step 816, the control circuitry can determine whether all pre-determined regions have been processed. If, at step 816, the control circuitry determines that all pre-determined regions have not been processed, process 800 may return to step 808 so that the control circuitry continue processing the rest of the pre-determined regions.

If, at step 816, the control circuitry instead determines that all pre-determined regions have been processed, process 800 may then end at step 818.

In conclusion, various embodiments are disclosed for focus recovery of multi-channel images. In some embodiments, an imaging system is provided which can include a lens, sensor, memory, and control circuitry. The control circuitry can perform cross-channel focus recovery on the multi-channel images obtained from the sensor.

The recovery process can restore an observed image obtained from the sensor by removing lens blurring, sensor noise, and signal offset between multiple color channels of the observed image (e.g., green1 and green2 color channels). In some embodiments, the control circuitry can begin the recovery process by calculating signal offset estimates from observed signals received from a pre-determined window of the observed image. Then, by estimating statistics of offset-removed signals, the control circuitry can determine a cross-channel SNR estimate, which can include information about sensor noise. Based on the cross-channel SNR estimate, information associated with the cross-channel PSF, and information associated with one or more weights, the control circuitry can generate a recovery kernel. The control circuitry can then remove the signal offset estimates from the observed signals. After removing the signal offset estimates, the control circuitry can apply the recovery kernel to the offset-removed signals to generate recovered signals. Thus, the cross-channel focus recovery process can be adaptive to multiple inputs including, for example, signal and signal-dependent noise statistics, available information about image blurring, and the sensor state signals.

In other embodiments, instead of explicitly calculating one or more estimates of a signal offset of the observed signals, the control circuitry can implicitly remove the signal offset from the first order statistic of the first and second observed signals. For example, the control circuitry can calculate the first order statistic of the first and second observed signals by averaging a first local sample mean of a first observed signal and a second local sample mean of a second observed signal. As a result of the averaging, a signal offset of the first and second observed signals can be automatically removed from the first order statistic. In addition, the control circuitry may need to correct for the signal offset when calculating a second order statistic of the first and second observed signals. For example, the control circuitry may need to compensate for the signal offset by averaging local sample variances of the first and second observed signals and subtracting a square of an estimate of the signal offset. As a result, the control circuitry may estimate the second order statistic of the first and second observed signals without explicitly removing a signal offset from each observed signal.

In some embodiments, additional processing may be performed in cross-channel focus recovery. For example, a selective TEF filter (e.g., a nonlinear anisotropic filter) can be applied in conjunction with the cross-channel recovery kernel to process high-frequency image content. As another example, in order to more closely approximate the location of one or more edges in the observed image, the control circuitry can determine an additional cross-channel SNR estimate based on statistics associated with the offset-removed signals.

By correcting for signal offset across spectrally similar cross-channels (e.g., green1 and green2 color channels) in cross-channel focus recovery, the control circuitry can recover the original signals with better fidelity. Furthermore, by performing the signal offset correction immediately after obtaining the observed image from a sensor, the control circuitry can address the signal offset at an earlier point of processing in order to limit additional information distortion that may be introduced by other operations in the imaging system.

Moreover, cross-channel focus recovery can allow the control circuitry to sample the observed image at a higher sampling rate for cross-channel recovery than the sampling rate used for per-channel recovery. For example, in order to remove cross-channel blurring, the control circuitry can finely sample the PSFs from the lens in a quincunx configuration across multiple color channels (e.g., both the green1 and green2 color channels) rather for only a single color channel (e.g., only the green1, green2, red, or blue color channel). Thus, a cross-channel recovery kernel generated based on the higher sampled PSFs can be used to recover higher frequencies in the observed image than would otherwise be possible in per-channel focus recovery. As another example, for a given size of a recovery kernel, more samples can be used for removing cross-channel sensor noise from channels in the cross-channel subset (e.g., the green1 and green2 color channels) as compared to channels in the per-channel subset (e.g., the red and blue color channels).

The described embodiments of the invention are presented for the purpose of illustration and not of limitation, and the invention is only limited by the claims which follow.

What is claimed is:

1. A method of restoring an image, comprising:
receiving a plurality of observed signals from a plurality of channels of the image, wherein the plurality of observed signals comprise a first observed signal and a second observed signal, and wherein the first and second observed signals are degradations of an original signal in a window of the image;
performing lens shading correction on the plurality of observed signals;
calculating one or more estimates of a signal offset of the first observed signal and the second observed signal, wherein the one or more estimates of the signal offset are measures of an imbalance between channels of the plurality of channels corresponding to the first observed signal and the second observed signal; and
generating at least one recovered signal based at least in part on the one or more estimates of the signal offset, said generating including:
calculating a cross-channel recovery kernel of a first offset removed signal and a second offset-removed signal;
removing the one or more estimates of the signal offset from the first observed signal and the second observed signal to generate the first offset-removed signal and the second offset-removed signal; and
applying the cross-channel recovery kernel to the first and the second offset-removed signals to generate the at least one recovered signal, wherein
(i) said calculating the cross-channel recovery kernel comprises:
receiving information associated with at least one point spread function (PSF), the at least one PSF comprising blurring information of the first and the second observed signals;
receiving information associated with one or more weights, the one or more weights are associated with one or more parameterizations of restoration kernels;
determining a cross-channel signal to noise ratio (SNR) estimate in the window, the cross-channel SNR estimate being a function of an estimated cross-channel variance of the original signal and an estimated variance of cross-channel sensor noise; and
generating the cross-channel recovery kernel based on one or more of the information associated with the at least one PSF, the information associated with the one or more weights, and the cross-channel SNR estimate, and
(ii) said determining the cross-channel SNR estimate comprises:
receiving at least one sensor state signal;
determining the estimated variance of the cross-channel sensor noise based on the at least one sensor state signal and at least one statistic associated with the first offset-removed signal and the second offset-removed signal;
determining the estimated cross-channel variance of the original signal based on one or more of (a) the information associated with the at least one PSF, (b) the estimated variance of the cross-channel sensor noise, and (c) the at least one statistic associated with the first offset-removed signal and the second offset-removed signal; and
generating the cross-channel SNR estimate, wherein the cross-channel SNR estimate is a ratio between the estimated cross-channel variance of the original signal and the estimated variance of the cross-channel sensor noise.

2. The method of claim 1, wherein the first observed signal is from a first green color channel of the image and the second observed signal is from a second green color channel of the image.

3. The method of claim 2, wherein the plurality of observed signals further comprise a third observed signal and a fourth observed signal, and wherein the third and fourth observed signals are degradations of the original signal from the window of the image.

4. The method of claim 3, wherein the third observed signal is from a red color channel of the image and the fourth observed signal is from a blue color channel of the image.

5. The method of claim 1, wherein the image is a Bayer-pattern image.

6. The method of claim 1, wherein the information associated with the at least one PSF comprises at least one of a regularized inverse of the at least one PSF and at least one blurring constant.

7. The method of claim 1, wherein the information associated with the one or more weights is a function of SNR at each pixel in the image.

8. The method of claim 7, wherein the generating the cross-channel recovery kernel comprises:
determining a weight for the cross-channel SNR estimate using the information associated with the one or more weights; and
performing a linear combination of a box filter and the regularized inverse of the at least one PSF based on the determined weight.

9. The method of claim 1, wherein the applying the cross-channel recovery kernel comprises performing a cross-channel convolution between the cross-channel recovery kernel and the first and the second offset-removed signals.

10. A method of restoring an image, the method comprising:
receiving a plurality of observed signals from a plurality of channels of the image, wherein the plurality of observed signals comprise a first observed signal and a second observed signal, and wherein the first and second observed signals are degradations of an original signal in a window of the image;
performing lens shading correction on the plurality of observed signals;
calculating one or more estimates of a signal offset of the first observed signal and the second observed signal; and
generating at least one recovered signal based at least in part on the one or more estimates of the signal offset, wherein the calculating the one or more estimates of a signal offset is performed according to:

$$r_{G1} = \text{sign}(\mu_{g_1'} - \hat{\mu}_g)\min(\text{abs}(\mu_{g_1'} - \hat{\mu}_g), th1)$$

$$r_{G2} = \text{sign}(\mu_{g_2'} - \hat{\mu}_g)\min(\text{abs}(\mu_{g_2'} - \hat{\mu}_g), th2),$$

wherein $r_{G1}$ is an estimate of the signal offset of the first observed signal, $\mu_{g_1'}$ is a first order statistic of the first observed signal, $r_{G2}$ is an estimate of the signal offset of the second observed signal, $\mu_{g2}$ is a first order statistic of the second observed signal, $\mu_g$ is an estimated mean of a first offset-removed signal and a second offset-removed signal, and th1 and th2 are functions characteristic of the signal offset.

11. A method of restoring an image, the method comprising:
   receiving a plurality of observed signals from a plurality of channels of the image, wherein the plurality of observed signals comprise a first observed signal and a second observed signal, and wherein the first and second observed signals are degradations of an original signal in a window of the image;
   performing lens shading correction on the plurality of observed signals;
   calculating a first order statistic of the first observed signal and the second observed signal;
   calculating a second order statistic of the first observed signal and the second observed signal, the second order statistic being different from the first order statistic;
   determining a cross-channel signal to noise ratio (SNR) estimate based at least in part on the first order statistic and the second order statistic; and
   non-iteratively generating at least one recovered signal based at least in part on information associated with at least one point spread function (PSF) and the cross-channel SNR estimate.

12. The method of claim 11, wherein the first observed signal is from a first green color channel of the image and the second observed signal is from a second green color channel of the image.

13. The method of claim 11, wherein the calculating the first order statistic comprises:
   calculating a first local sample mean of the first observed signal;
   calculating a second local sample mean of the second observed signal; and
   averaging the first local sample mean and the second local sample mean.

14. The method of claim 11, wherein the generating the at least one recovered signal comprises:
   receiving information associated with one or more weights, wherein the one or more weights are associated with one or more parameterizations of restoration kernels;
   generating a cross-channel recovery kernel based on the information associated with the PSF, the information associated with the one or more weights, and the cross-channel SNR estimate;
   performing a first convolution between the cross-channel recovery kernel and the first observed signal to generate a first recovered signal; and
   performing a second convolution between the cross-channel recovery kernel and the second observed signal to generate a second recovered signal.

15. The method of claim 14, wherein the information associated with the at least one PSF comprises at least one of a regularized inverse of the at least one PSF and at least one blurring constant.

16. The method of claim 15, wherein the information associated with the one or more weights is a function of SNR at each pixel in the image.

17. The method of claim 16, wherein the generating the cross-channel recovery kernel comprises:
   determining a weight for the cross-channel SNR estimate using the information associated with the one or more weights; and
   performing a linear combination of a box filter and the regularized inverse of the at least one PSF based on the determined weight.

18. A method of restoring an image, the method comprising:
   receiving a plurality of observed signals from a plurality of channels of the image, wherein the plurality of observed signals comprise a first observed signal and a second observed signal, and wherein the first and second observed signals are degradations of an original signal in a window of the image;
   performing lens shading correction on the plurality of observed signals;
   calculating a first order statistic of the first observed signal and the second observed signal;
   calculating a second order statistic of the first observed signal and the second observed signal;
   determining a cross-channel signal to noise ratio (SNR) estimate based at least in part on the first order statistic and the second order statistic; and
   generating at least one recovered signal based at least in part on information associated with at least one point spread function (PSF) and the cross-channel SNR estimate, wherein the generating the at least one recovered signal comprises:
      receiving information associated with one or more weights, wherein the one or more weights are associated with one or more parameterizations of restoration kernels;
      generating a cross-channel recovery kernel based on the information associated with the PSF, the information associated with the one or more weights, and the cross-channel SNR estimate; and
      performing a cross-channel convolution between the cross-channel recovery kernel and the first and the second observed signals to generate the at least one recovered signal.

19. The method of claim 18, wherein the information associated with the at least one PSF comprises at least one of a regularized inverse of the at least one PSF and at least one blurring constant.

20. The method of claim 19, wherein the information associated with the one or more weights is a function of SNR at each pixel in the image.

21. The method of claim 20, wherein the generating the cross-channel recovery kernel comprises:
   determining a weight for the cross-channel SNR estimate using the information associated with the one or more weights; and
   performing a linear combination of a box filter and the regularized inverse of the at least one PSF based on the determined weight.

22. An imaging system for focus recovery comprising:
   a sensor configured to:
      sample an image captured through a lens; and
      generate an observed image with a plurality of channels from the image; and
   control circuitry configured to:
      receive a plurality of observed signals from the sensor, wherein each observed signal of the plurality of observed signals is associated with a channel of the plurality of channels;
      determine a first subset of the plurality of observed signals, wherein the first subset has channels corresponding to a plurality of cross-channels;

determine a second subset of the plurality of observed signals, wherein the second subset has channels corresponding to a plurality of per-channels;

perform cross-channel focus recovery on the first subset of the plurality of observed signals by jointly processing signals of the first subset of the plurality of observed signals; and perform per-channel focus recovery on the second subset of the plurality of observed signals by separately processing each signal of the second subset of the plurality of observed signals.

23. The imaging system of claim 22, wherein the observed image is a Bayer-pattern image.

24. The imaging system of claim 23, wherein the plurality of cross-channels comprise a first green color channel and a second green color channel of the Bayer-pattern image.

25. The imaging system of claim 23, wherein the plurality of per-channels comprise a red color channel and a blue color channel of the Bayer-pattern image.

26. The imaging system of claim 22, wherein the control circuitry is configured to perform cross-channel focus recovery on the first subset of the plurality of observed signals by:

performing lens shading correction on the first subset of the plurality of observed signals;

calculating one or more estimates of a signal offset of the first subset of the plurality of observed signals; and generating a recovered signal by removing cross-channel blurring and cross-channel sensor noise from the first subset of the plurality of observed signals based at least in part on the one or more estimates of the signal offset.

27. The imaging system of claim 22, wherein the control circuitry is further configured to perform per-channel focus recovery on the second subset of the plurality of observed signals by:

performing lens shading correction on the second subset of the plurality of observed signals; and generating a recovered signal corresponding to the second subset of the plurality of observed signals by separately processing each signal of the second subset, wherein the processing comprises removing per-channel blurring and per-channel sensor noise from each signal.

28. A semiconductor chip comprising:

memory configured to:

store information associated with at least one point spread function (PSF), wherein the at least one PSF comprises blurring information of a plurality of observed signals from a plurality of channels of the image; and information associated with one or more weights, wherein the one or more weights are associated with one or more parameterizations of restoration kernels;

a sensor configured to capture an image; and control circuitry configured to:

receive, from the sensor, the plurality of observed signals, wherein the plurality of observed signals comprise a first observed signal and a second observed signal in a first window of the image, and wherein the first window is centered at a pixel in the image;

perform lens shading correction on the plurality of observed signals;

calculate one or more estimates of a signal offset of the first observed signal and the second observed signal;

receive, from the sensor, at least one sensor state signal;

generate a local estimate of channel noise statistics based on the at least one sensor state signals and at least one statistic associated with a first offset-removed signal and a second offset-removed signal, wherein the local estimate of channel noise statistics comprises an estimated variance of cross-channel sensor noise; and receive, from the memory, the information associated with the at least one PSF, wherein the information associated with the at least one PSF comprises at least one of a regularized inverse of the at least one PSF and at least one blurring constant;

determine an estimated cross-channel variance of an original signal based on one or more of the information associated with the at least one PSF, the estimated variance of the cross-channel sensor noise, and the at least one statistic associated with the first offset-removed signal and the second offset-removed signal; and determine a cross-channel signal to noise ratio (SNR) estimate in the first window, wherein the cross-channel SNR estimate is a function of the estimated cross-channel variance of the original signal and the estimated variance of the cross-channel sensor noise.

29. The chip of claim 28, wherein the control circuitry is further configured to:

determine an alternative cross-channel SNR estimate in a second window in the image, wherein the second window is smaller than the first window and wherein the second window is centered at the same pixel as the first window;

determine if a value of the cross-channel SNR estimate is greater than a value of the alternative cross-channel SNR estimate;

in response to determining that the value of the cross-channel SNR estimate is greater than the value of the alternative cross-channel SNR estimate, set the value of the cross-channel SNR estimate to the value of the alternative cross-channel SNR estimate.

30. The chip of claim 29, wherein the control circuitry is further configured to:

receive, from the memory, the information associated with the one or more weights, wherein the information associated with the one or more weights is a function of SNR at each pixel in the image;

determine a weight for the cross-channel SNR estimate using the information associated with the one or more weights;

perform a linear combination of a box filter and the regularized inverse of the at least one PSF based on the determined weight; and generate a cross-channel recovery kernel based on one or more of the information associated with the at least one PSF, the information associated with the one or more weights, and the cross-channel SNR estimate.

31. The chip of claim 30, wherein the control circuitry is further configured to:

remove the one or more estimates of the signal offset from the first observed signal and the second observed signal to generate the first offset-removed signal and the second offset-removed signal; and generate at least one recovered signal by applying the cross-channel recovery kernel to the first and the second offset-removed signals.

* * * * *